US006212766B1

(12) United States Patent
Ohsumi et al.

(10) Patent No.: US 6,212,766 B1
(45) Date of Patent: Apr. 10, 2001

(54) APPARATUS FOR INSERTING TERMINAL WITH WIRE AND DRIVING A WIRE SWEEPING ARM

(75) Inventors: Yoshihisa Ohsumi; Hiroo Suzuki; Takao Nakagame; Takamichi Maejima; Toshihiro Inoue; Osamu Yamashima; Fumio Kato; Toshinori Igura, all of Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 08/904,751

(22) Filed: Aug. 1, 1997

Related U.S. Application Data

(62) Division of application No. 08/457,777, filed on Jun. 1, 1995, now Pat. No. 5,697,147, which is a division of application No. 08/179,625, filed on Jan. 7, 1994, now Pat. No. 5,459,924.

(30) Foreign Application Priority Data

| | | |
|---|---|---|
| Jan. 11, 1993 | (JP) | 5-2482 |
| Aug. 24, 1993 | (JP) | 5-209145 |
| Dec. 6, 1993 | (JP) | 5-305149 |
| Dec. 10, 1993 | (JP) | 5-310273 |

(51) Int. Cl.[7] ............ B23P 19/04; H01R 43/055

(52) U.S. Cl. ............ 29/755; 29/33 F; 29/33 M; 29/748; 29/747

(58) Field of Search ............ 29/747, 748, 755, 29/759, 760, 33 F, 33 M, 876; 269/903

(56) References Cited

U.S. PATENT DOCUMENTS

| | | | | |
|---|---|---|---|---|
| 4,779,334 | | 10/1988 | Boutcher, Jr. | 29/759 X |
| 4,825,537 | | 5/1989 | Berry et al. | 29/876 X |
| 4,864,718 | | 9/1989 | Ricard | 29/739 |
| 4,967,470 | * | 11/1990 | Folk | 29/759 |
| 5,355,583 | | 10/1994 | Osumi et al. | 29/876 |
| 5,515,601 | | 5/1996 | Maejime | 29/33 M X |
| 5,615,478 | * | 4/1997 | Celoudoux et al. | 29/748 |
| 5,657,535 | * | 8/1997 | Maejima | 29/748 |
| 5,704,110 | * | 1/1998 | Erhard et al. | 29/33 M |
| 5,737,829 | * | 4/1998 | Wolfe et al. | 29/747 |
| 5,774,983 | * | 7/1998 | Maejima | 29/748 |

FOREIGN PATENT DOCUMENTS

| | | | | |
|---|---|---|---|---|
| 2059 392 | | 12/1970 | (DE) . | |
| 3826990 | | 5/1990 | (DE) . | |
| 0 299 897 | | 1/1989 | (EP) . | |
| 391239 | | 10/1990 | (EP) . | |
| WO 93/00730 | * | 1/1993 | (EP) | 29/845 |
| 85-119090 | | 6/1985 | (JP) . | |
| 86-104578 | | 5/1986 | (JP) . | |

* cited by examiner

*Primary Examiner*—Lee Young
*Assistant Examiner*—A. Dexter Tugbang
(74) *Attorney, Agent, or Firm*—Armstrong, Westerman, Hattori, McLeland & Naughton

(57) ABSTRACT

A method of automatically inserting terminals with wires into desired terminal accommodating cavities in a connector housing after putting neighboring wires aside, and a wire sweeping arm and a driving device for the sweeping arm. The method includes the steps of: grasping the terminal with wire by terminal supporting hands and wire supporting hands; moving the wire sweeping arm in the direction that the wire sweeping arm sweep wires which are already accommodated in neighboring terminal accommodating cavities, the wire sweeping arm being disposed between the terminal accommodating cavities and the terminal supporting hands so as to move back and forth; moving the wire supporting hands and the terminal supporting hands toward the connector housing to insert the terminal with wire into the terminal accommodating cavity.

11 Claims, 32 Drawing Sheets

APPARATUS FOR INSERTING TERMINAL WITH WIRE AND DRIVING A WIRE SWEEPING ARM

This is a divisional of application Ser. No. 08/457,777 filed Jun. 1, 1995, now U.S. Pat. No. 5,697,147 allowed; which is a divisional of application Ser. No. 08/179,625 filed Jan. 7, 1994, now U.S. Pat. No. 5,459,924.

BACKGROUND OF THE INVENTION

1. Field of the Invention

The present invention relates to a method of automatically inserting terminals with wires into desired terminal accommodating cavities in a connector housing after putting neighboring wires aside, and an apparatus used for the method.

2. Description of the Related Art

FIG. 45 shows a conventional method of inserting a terminals with wires, which is disclosed in Japanese Patent Application Laid-open No. Showa 61-104578.

In this method, one of terminals 37 and 38 attached to both ends of a wire 36 is inserted into a connector housing 40 at an end of a transportation line 39, and then, the other terminal 38 is transported on a supporting portion 44 on a rearrangement station 43 by a transportation head 42 on a base 41. This rearrangement is carried out to insert the terminal 38 in a predetermined position of the a connector housing 45 in the next process in order. Then, the terminal 38 is inserted into a connector housing 45 in the order that they are placed on the station 43.

However, with the conventional method described above, it is inevitable to rearrange the terminals with wires 47 so that the terminals 38 are inserted into the predetermined terminal accommodating cavities in the connector housing 45 without being interfered by terminals 36 which are already accommodated, resulting in increased manhour and an expanded manufacturing line. As a result, it has been difficult to manufacture a wire harness with a lot of wires due to limited manufacturing space.

SUMMARY OF THE INVENTION

It is therefore an object of the present invention to provide a method of securely inserting terminals with wires into desired terminal accommodating cavities in a connector housing without rearranging the terminals, and an apparatus used for the method.

To accomplish the above object, the method for the inserting of terminals with wires into terminal accommodating cavities according to an embodiment of the present invention comprising the steps of: grasping the terminal with wire by terminal supporting hands and wire supporting hands; moving the terminal supporting hands in the direction that the terminal supporting hands sweep wires which are already accommodated in neighboring terminal accommodating cavities; moving the wire supporting hands and the terminal supporting hands toward the connector housing to insert the terminal with wire into the terminal accommodating cavity.

Further, the method of inserting a terminal with wire into a terminal accommodating cavities according to another embodiment of the present invention comprising the steps of: grasping the terminal with wire by terminal supporting hands and wire supporting hands; moving wire sweeping arms in the direction that the wire sweeping arms sweep wires which are already accommodated in neighboring terminal accommodating cavities, the wire sweeping arms disposed between the terminal accommodating cavities and the terminal supporting hands so as to move back and forth; moving the wire supporting hands and the terminal supporting hands toward the connector housing to insert the terminal with wire into the terminal accommodating cavity.

In the above methods according to the present invention, it is preferable to adopt wire sweeping arms comprising: a pair of guide arms with triangular cross-sections, the guide arms each having a triangular tip portion to form an edge when the guide arms are combined; an inclined guide portion projecting from an engagement face of a first guide arm of the pair of guide arms; a notch attached to an engagement face of a second guide arm of the pair of guide arms for accommodating the inclined guide portion.

As a driving device for the wire sweeping arms to perform the method of inserting the terminal with wire into the terminal accommodating cavity comprising: an air cylinder with a pair of legs for fixing a pair of guide arms, the guide arms used for sweeping the already accommodated wires and inserting the terminal with wire into the terminal accommodating cavities; a stopper abutting an outer face of one of the legs; a holder for fixing the stopper; a guide rail on which the holder travels in the direction perpendicular to the direction that the terminal with wire is inserted; a screw rod rotatably inserted into the holder; and a servo motor for rotating the screw shaft.

BRIEF DESCRIPTION OF THE DRAWINGS

The present invention will be more apparent from the ensuring description with reference to the accompanying drawings wherein.

DETAILED DESCRIPTION OF PREFERRED EMBODIMENTS

Figure 1:
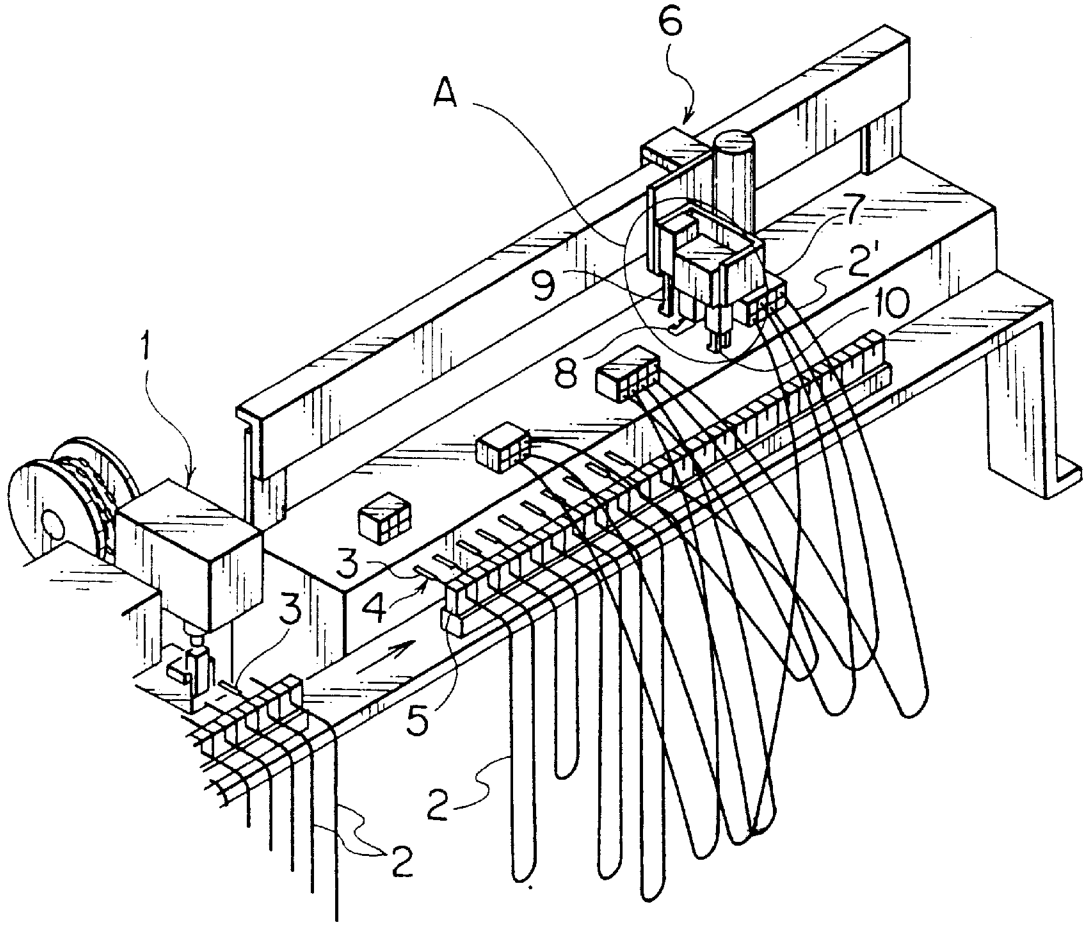
FIG. 1 is a perspective view for explaining a method of inserting terminals with wires according to a first embodiment of the present invention.

FIG. 1 is a perspective view for explaining a method of inserting terminals with wires into terminal accomodating cavities in a connector housing according to one embodiment of the present invention. In this method, terminals with wires 4, which are attached to both ends of the terminals by a press 1, are transported to a terminal inserting device 6 while the terminals are grasped by a grasping base 5. Then, the terminals are horizontally inserted into the connector housing 7 by using an insertion head A. The present invention is characterized in that terminals, which are already accommodated in the terminals accommodating cavities are put aside by terminal supporting hands 8 and wire sweeping arms 9 on the insertion head A during inserting the terminals with wires into the housing.

Wire supporting hands 10 and a pair of wire sweeping arms are mounted on the insertion head A with the terminal supporting hands 8 in between. The terminal supporting hands 8 are capable of putting wires 2' aside by oscillating the wire sweeping arms right and left which are driven by a driving device (not shown). In addition, the terminal supporting hands 8 move up and down, and back and forth to insert the wire in synchronization with the movement of the wire supporting hands 10, and another driving device described below opens and closes the wire sweeping arms 9, and moves them up and down.

Figure 2:
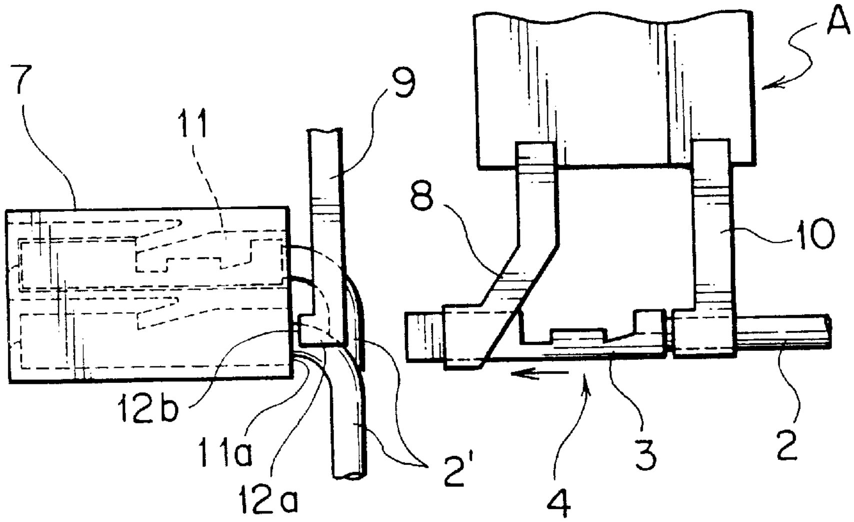
FIG. 2 is a side view showing the working of an insertion head A illustrated in FIG. 1 when wires are put aside by wire sweeping arms.

FIGS. 2 to 5 show the working of the insertion head A described above. As illustrated in FIG. 2, a base of a wire 2 is grasped by the terminal supporting hands 10, and a tip of a terminal 3 is simultaneously grasped by the wire supporting hands 8 to be transported from the grasping base to an opening 11*a* of the terminal accommodating cavities in the connector housing 7. The working of the supporting hands 8 and 10 are disclosed in Japanese Patent Application Laid-Open No. Showa 60-119090. Then, when the terminal 3 approaches the openings 11*a* of the terminal accommodating cavities 11, the wire sweeping arms 9 fall and open in the vicinity of the openings 11*a* to put the neighboring wires 2' right and left.

Figure 3:
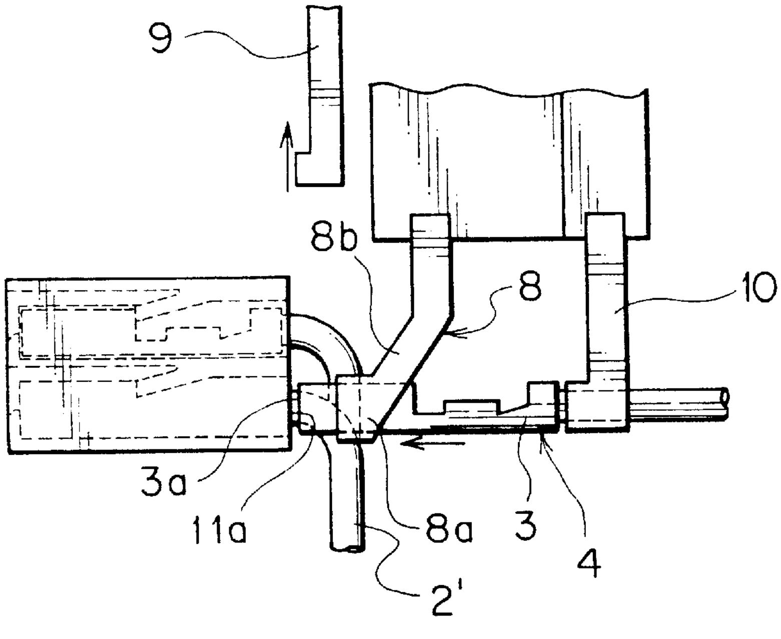
FIG. 3 is a side view showing the working of the insertion head A when the wires put aside by a terminal supporting hand.
Figure 4:
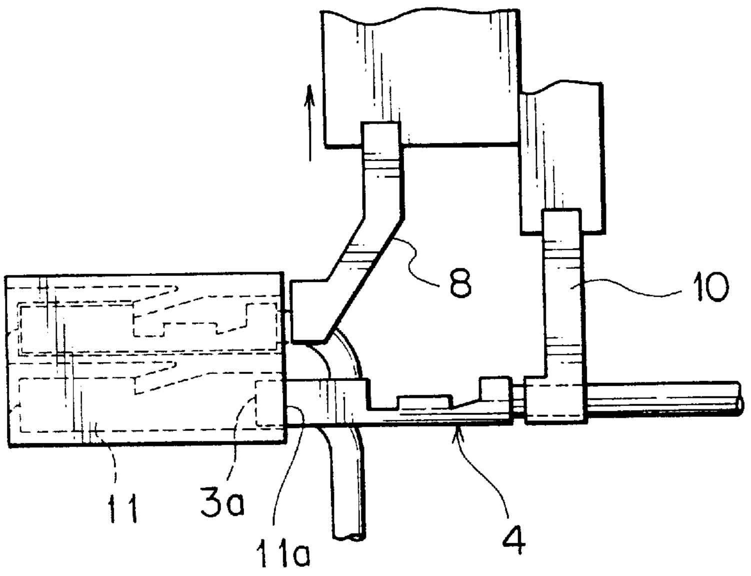
FIG. 4 is a side view showing the working of the insertion head A when the wires are being inserted.
Figure 5:
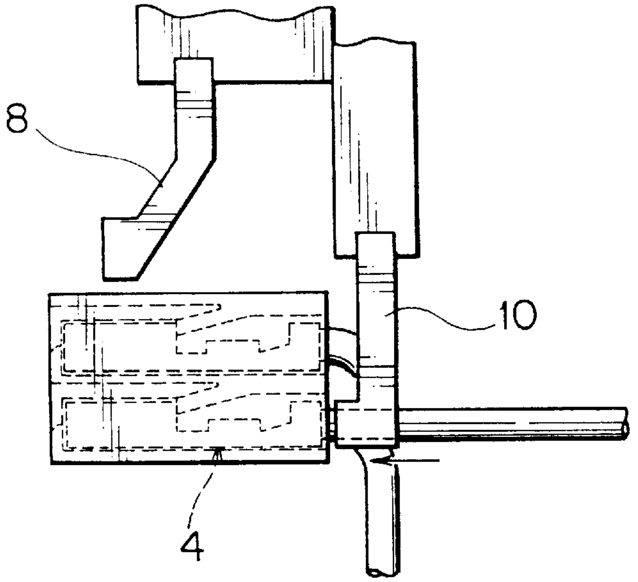
FIG. 5 is a side view showing the working of the insertion head 1A when the wires are completely inserted.

Then, the wire sweeping arms 9 elevate and the supporting hands 8 and 10 cause the terminal with wire 4 to proceed in the vicinity of the openings 11*a* of the terminal accommodating cavities as shown in FIG. 3. In this condition, the terminal supporting hands 6 oscillate right and left to supplementally put the wires 2' aside. Tip portions 8*a* of the terminal supporting hands 8 are integrally formed with slant supporting arms 8*b*, and horizontally extend and grasp the terminal 3 in such a manner that a tip 3*a* of the terminal 3 slightly projects from the tip portions 8*a* of the terminal supporting hands 8. The terminal supporting hands 8 elevate under the conditions that the tip 3*a* of the terminal passes through the opening 11*a* of the terminal accommodating cavities as illustrated in FIG. 4, and the wire supporting hands 10 push the terminal with wire 4 into the terminal accommodating cavities 11 as illustrated in FIG. 5.

Figure 6:
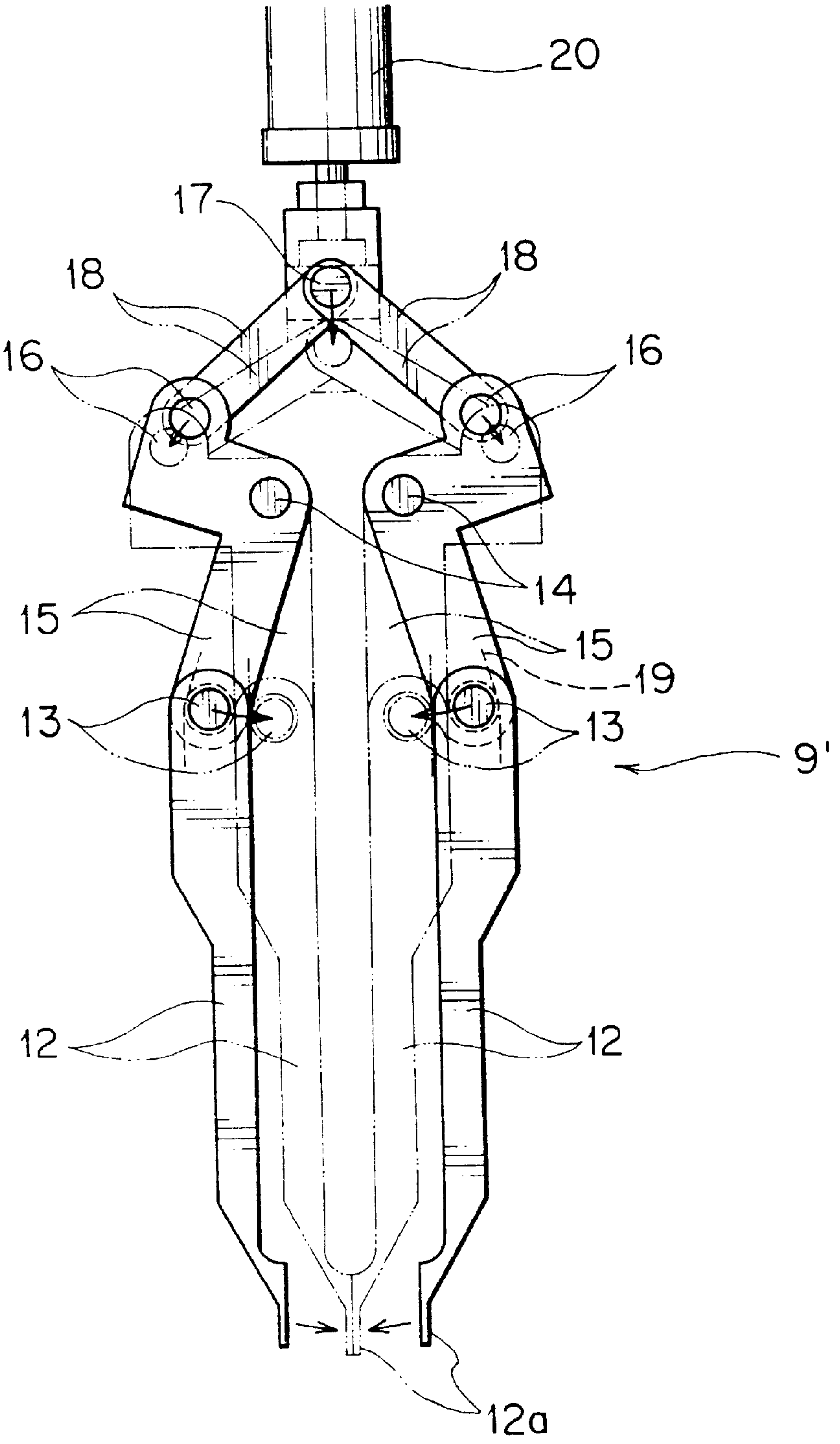
FIG. 6 is a front view of the wire sweeping arms.

FIG. 6 is a front view of wire sweeping arms according to an embodiment of the present invention. The wire sweeping arms 9' comprise: a pair of lower links 12 having blade-shaped sweeping portions 12*a* at both lower end portions thereof; a pair of crank-shaped middle links 15 which are rotatably supported in the middle thereof by fixed supports and are connected to base portions of the lower links 12 with pins 13; and a pair of upper links 18 which are connected to the middle links with pins 16 and are connected to each other with a top pin 17. The pair of lower links 12 are substantially horizontally opened by means of coil springs 19.

The sweeping portions 12*a* are formed like thin blades so that they are easily put between the wires 2'. Further, projections 12*b* may preferably be attached to the sweeping portions 12*a* on the side opposing the openings 11*a* of the sweeping portions 12*a* as illustrated in FIG. 2. The wire sweeping arms 9' are closed by pushing the top of the upper links 18 as indicated by dotted lines or are opened by drawing the same portion as indicated by solid lines with a cylinder 20 as illustrated in FIG. 6.

Figure 7:
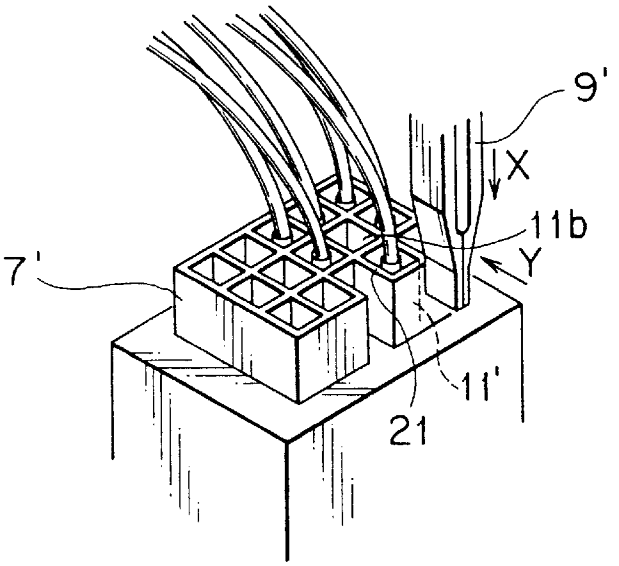
FIG. 7 is a perspective view of the wire sweeping arms and terminal accommodating cavities when the wires are vertically inserted into the cavities.
Figure 8:
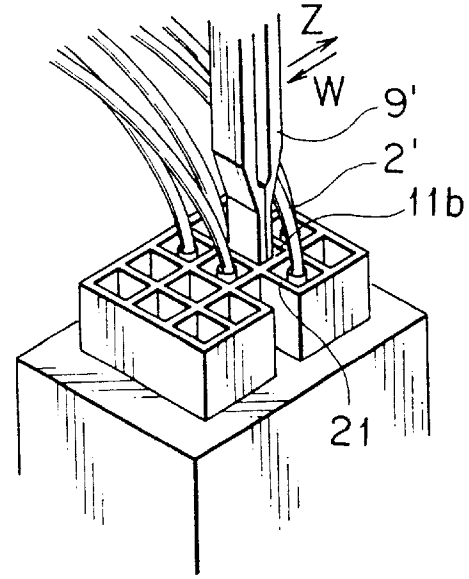
FIG. 8 is a perspective view of the wire sweeping arms and the terminal accommodating cavities when the wires are put aside by the wire sweeping arms.
Figure 9:
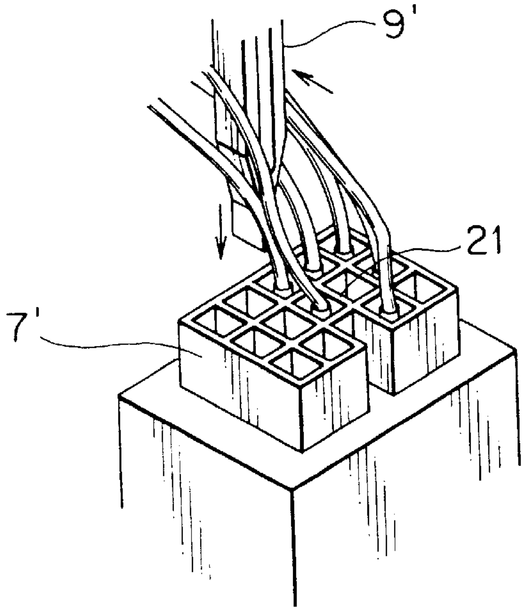
FIG. 9 is a perspective view of the wire sweeping arms and the terminal accommodating cavities when the wire sweeping terminal is rearwardly moved.
Figure 10:
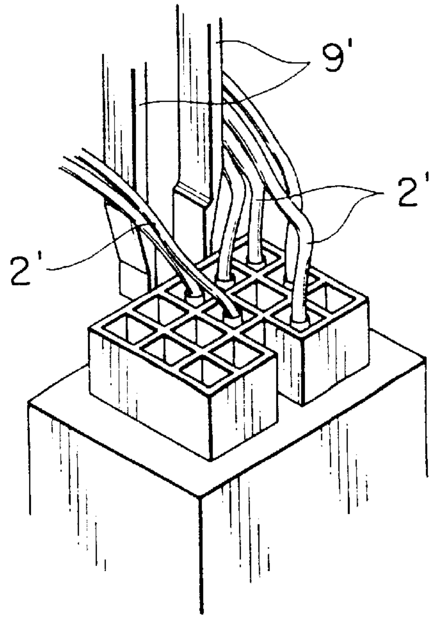
FIG. 10 is a perspective view of the wire sweeping arms and the terminal accommodating cavities when the wire sweeping arm is opened.

FIGS. 7 to 12 show an example to which the above method of vertically inserting terminals with wires into openings of a connector housing is applied. In FIG. 7, reference numeral 9' shows wire sweeping arms which are substantially the same as in the above described embodiment. The wire sweeping arms 9 approach and move along a desired opening 11*b* of the terminal accommodating cavities in the directions indicated by arrows X and Y in this order, and then, the arms 9 oscillate right and left as shown by arrows Z and W in the vicinity of the opening 11*b* to put the wires 2' aside. Further, the sweeping arms 9' rearwardly move over the partition walls 21 as illustrated in FIG. 9, and go down behind a rear end of the housing 7' and open right and left to further put the wires 2' aside as illustrated in FIG. 10.

Figure 11:
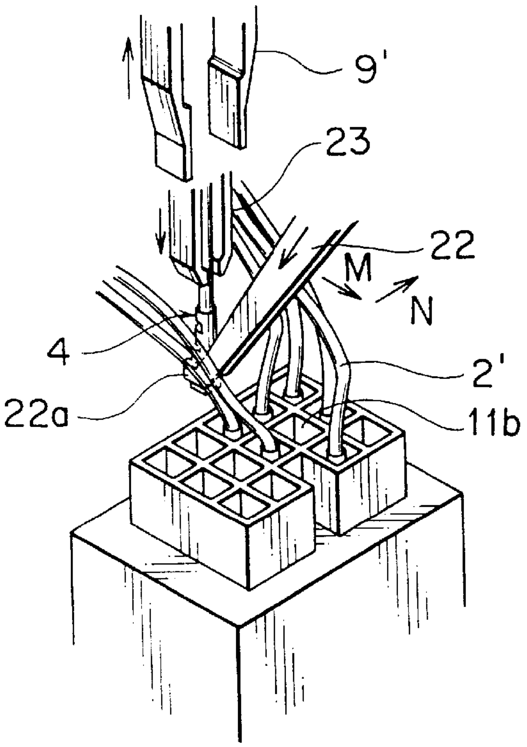
FIG. 11 is a perspective view of the wire sweeping arms, the terminal accommodating cavities, and a terminal supporting hands when the terminal supporting hands holding a terminal with wire proceeds.
Figure 12:
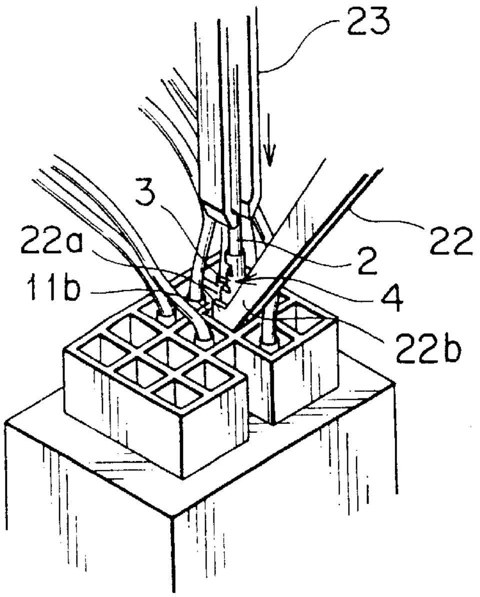
FIG. 12 is a perspective view of the wire sweeping arms, the terminal accommodating cavities, and the terminal supporting hands when the terminal supporting hands supplementally put the neighboring wires aside to insert the terminal with wire into the terminal accommodating cavity.

Under the condition described above, the sweeping arms 9' elevate as shown in FIG. 11, and the terminal supporting hands 22 and the wire supporting hands 23 grasping the terminal 4 with wire 2' fall in the vicinity of a portion where the sweeping arms 9' pass through a route, where the sweeping arms 9' move while putting the wires 2' aside, in the direction indicated by a arrow M. Then, both supporting hands 22 and 23 perpendicularly curve in the direction indicated by the arrow N in front of the desired opening 11*b* to supplementally sweep the wires 2' at tip portions 22*a* of the terminal supporting hands 22. Then, the terminal supporting hands 22 open over the opening 11*b* of the terminal accommodating cavities and the terminal 4 with wire 2' is pushed in the terminal accommodating cavity 11' by the wire supporting hands 23 as illustrated in FIG. 12. The tip portions 22*a* of the terminal supporting hands 22, which are horizontally integrally formed with inclined supporting arms 22*b*, are used for vertically supporting the terminal 3. The wire supporting hands 23 also support the wire 2 in the vertical direction thereof.

Figure 13:
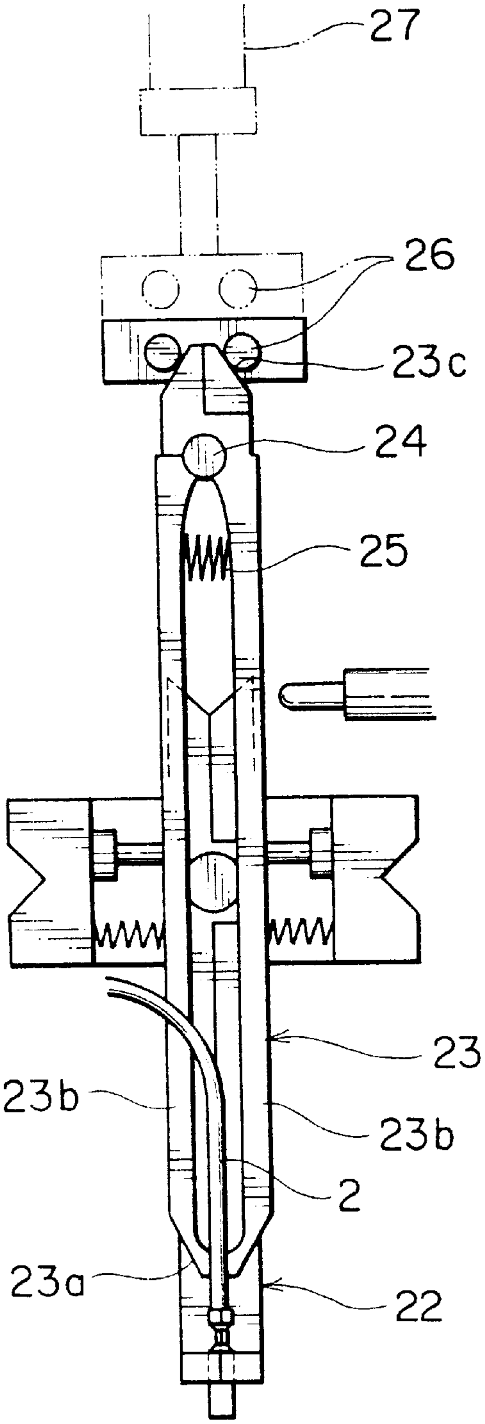
FIG. 13 is a detailed front view of the terminal supporting hands and a wire supporting hands.
Figure 14:
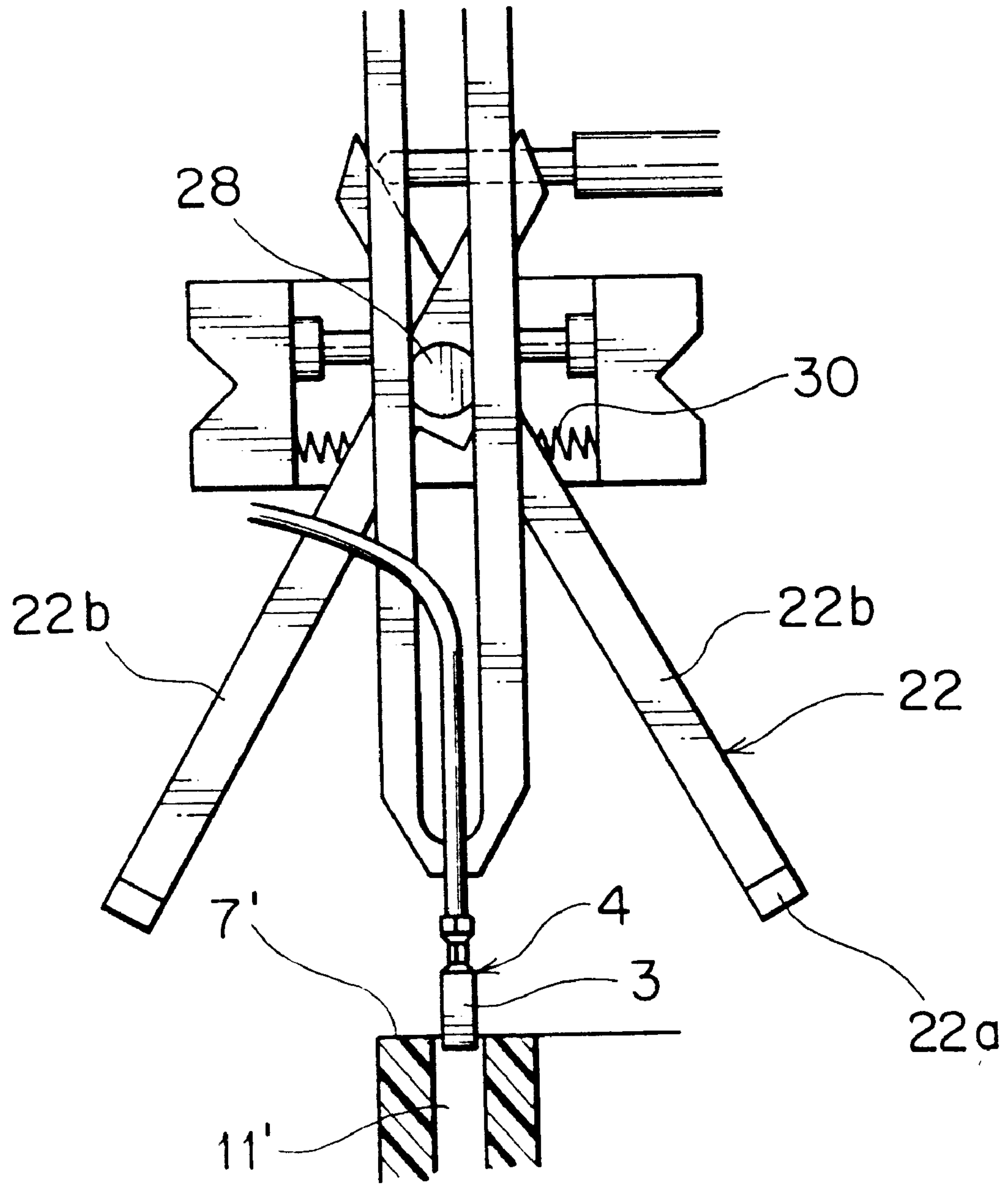
FIG. 14 is a front view of the terminal supporting hands in the open state.
Figure 15:
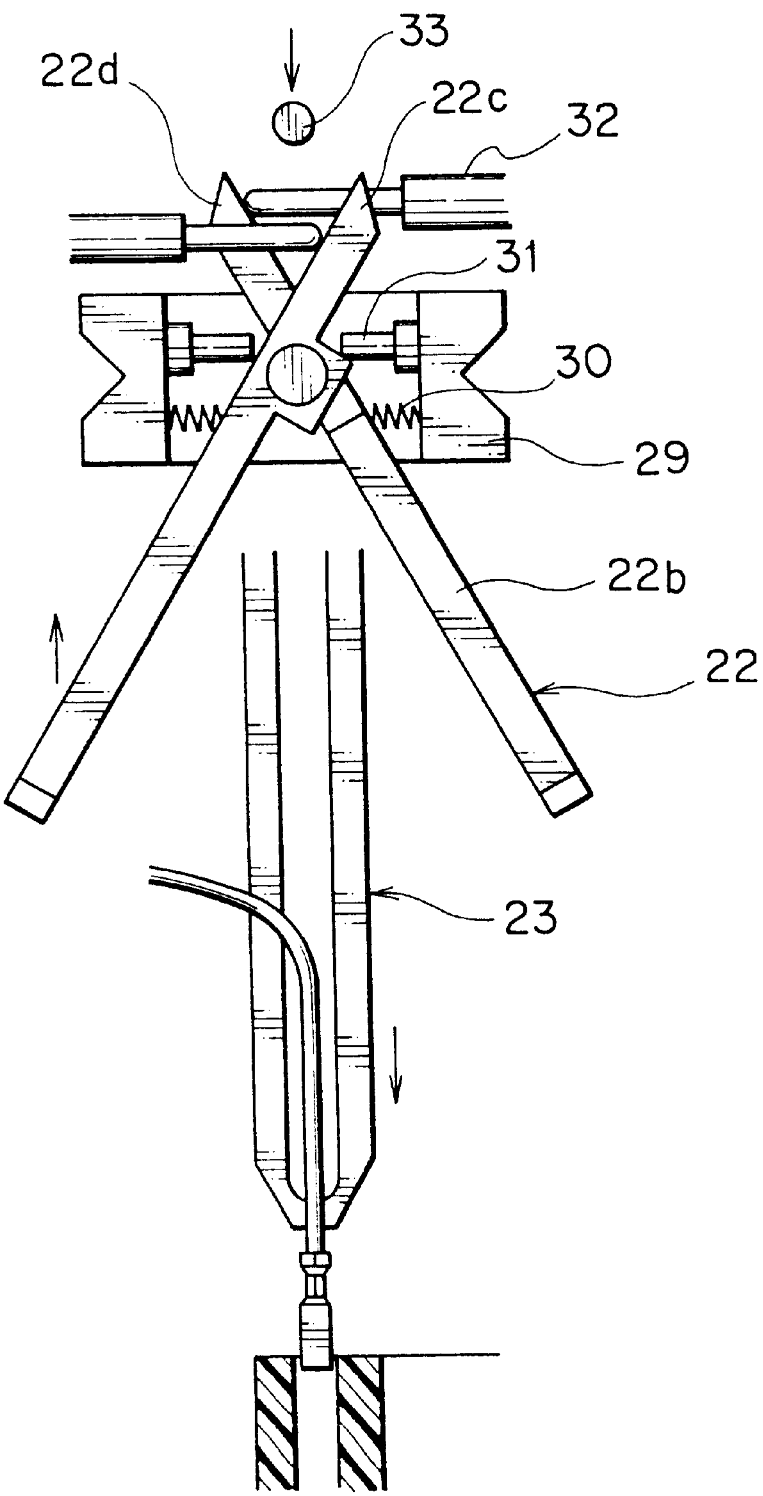
FIG. 15 is a front view of the terminal supporting hands before inserting the terminal with wire.

FIGS. 13 to 15 show the construction and working of the both supporting hands 22 and 23 in detail. As illustrated in FIG. 13, the wire supporting hands 23 comprise a pair of supporting hands 23*b* connected to each other with a pin 24 at upper portions thereof like a compass, and a spring 25 for outwardly urging the supporting hands 23*b*. A pair of rollers 26 are pushed toward tapered faces 23*c* which are formed at upper portions of the supporting hands 23*b* to close the supporting hands 23*b*. The tip portions 23*a* of the supporting arms 23*b* inwardly curve to grasp the wire 2.

Further, the terminal supporting hands 22 are provided with the horizontally extending tip portions 22*a*, as illustrated in FIGS. 14 and 15, and the pair of straight supporting hands 22*b* which are connected to each other with a pin 28. Springs 30 for urging the supporting hands 22*b* from outside in the direction that the supporting hands close between supporting members 29. Adjusting screws 31 are attached to adjust an opening angle of the supporting hands. As a result, the supporting hands 22*b* are opened by pushing upper portions 22*c* of the supporting hands 22*b* with the cylinders 32, and the rollers 33 abut the inner tapered faces 22*d* to close and lock the supporting hands 22*b*. The supporting hands 22 and 23 move up and down by a driving means (not shown) as illustrated in FIGS. 14 and 15. In the two embodiments described above, only the terminal supporting hands 8 or 22 may be used for putting the wires 2' aside without the wire sweeping arms 9 and 9'.

Figure 16:
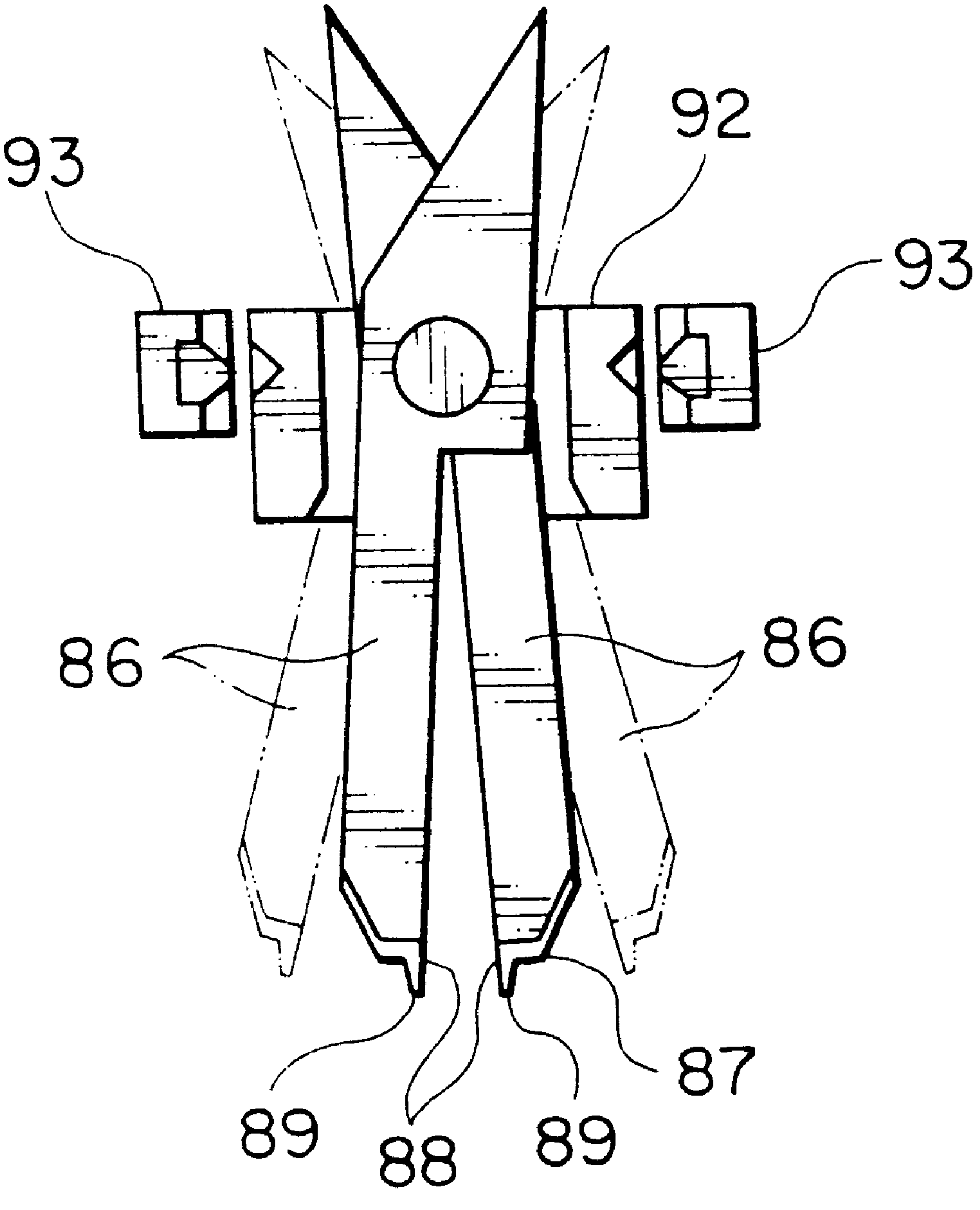
FIG. 16 is a perspective view of modified wire sweeping arms.
Figure 17:
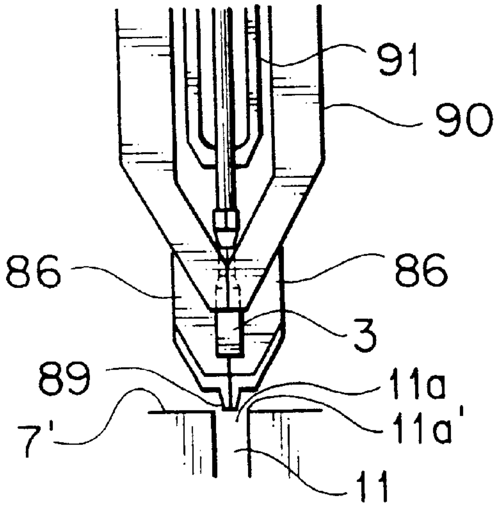
FIG. 17 is a front view of the wire sweeping arms approaching an opening of the terminal accommodating terminal.
Figure 18:
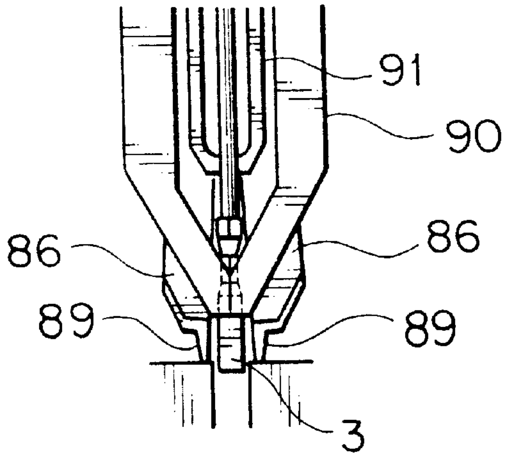
FIG. 18 is a front view of the wire sweeping arms and the terminal with wire between the arms.

FIGS. 16 to 18 show an embodiment for guiding a terminal 3 between a pair of wire sweeping arms 86 and to insert the terminal 3 into a terminal accommodating cavity 11. The pair of wire sweeping arms 86 are provided with forwardly projecting sweeping portions 87, and a pair of claws 89 which project from the sweeping portions 87 to form inner guide faces 88 as illustrated in FIG. 16. The pair of claws 89 may be opened slightly wider than that of the opening 11*a*, and may be opened much more as indicated by two-dot chain lines after inserting the terminal 3 into the cavity 11.

Then, the pair of claws 89 are opened by the width of the opening 11*a* while they are in close vicinity to the opening 11*a* as shown in FIGS. 17 and 18, and the terminal 3 of which rear portion is grasped by the terminal supporting hands 90 between the claws 89 is guided and inserted along the inner guide faces 88. When the tip of the terminal 3 is inserted into the opening 11*a*, the terminal supporting hands 91 further push the terminal 3 into the opening to complete the insertion. As a result, the terminal 3 is securely inserted into the opening without being interrupted by an edge 11*a'*of the opening 11*a*.

The wire sweeping arms 86 are supported by a holder 92 as illustrated in FIG. 16 and are detachable by a pair of block hands 93 opposing the holder 92 in accordance with the types of terminals 3 and connector housing 7'.

Figure 19:
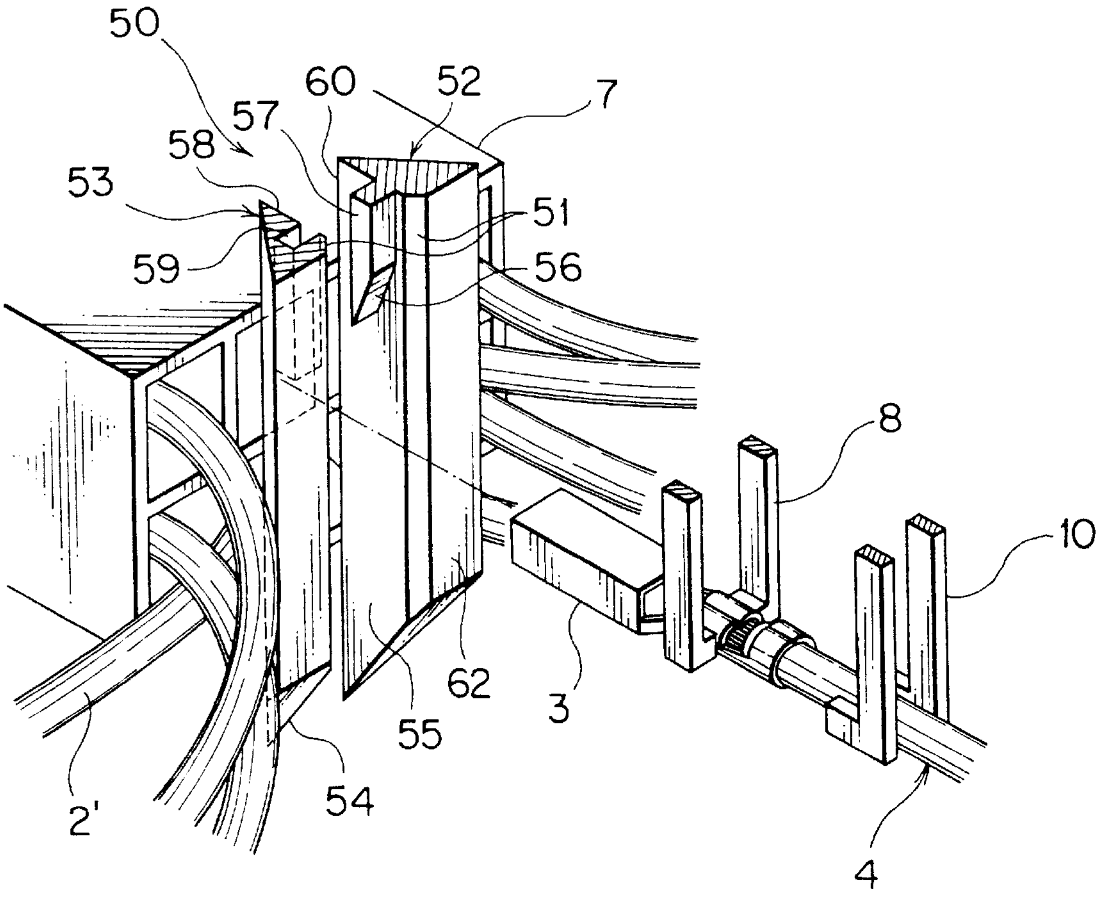
FIG. 19 is a perspective view of wire sweeping arms according to another embodiment of the present invention.

FIG. 19 shows a wire sweeping arm according to another embodiment of the present invention. The wire sweeping arm 50 is formed with a pair of guide arms 52 and 53 having triangular cross-sections with tapered guide faces 51 for guiding terminals at rear portions thereof. Both guide arms 52 and 53 are provided with tip portions with a shape of triangular pyramid, and those tip portions are combined and form one tip portion with a shape of a triangular pyramid when closing the both guide arms 52 and 53 as illustrated in FIGS. 20A and 20B.

A guide wall 57 projects on an upper portion of an inner wall 55 of one of the guide arms 52, and an inclined guide portion 56 for the terminal 3 is formed on the guide wall 57. On an inner wall 58 of the other guide arm 52 is formed a concave portion 59 for accommodating the guide wall 57. The guide wall 57 is fully accommodated in the concave portion 59 when the both guide arms 52 and 53 are combined. Both guide arms 52 and 53 are combined with the inner walls 55 and 58 being in contact with each other. The guide arms 52 and 53 have edge-shape cross-sections, and tips 60 of the edges oppose the connector housing 7, and rear walls 62 thereof oppose the terminal with wire 4, which is supported by the terminal supporting hands 8 and the wire supporting hands 10. The guide arms 52 and 53 are vertically and horizontally movable.

Figure 20C:
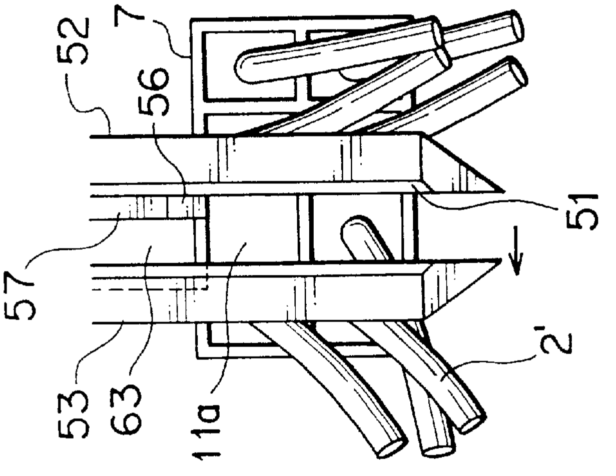
FIGS. 20A to 20C are front views of the wire sweeping arms before being inserted into the wires, while being inserted into the wires, and after putting the wires aside in that order.
Figure 20B:
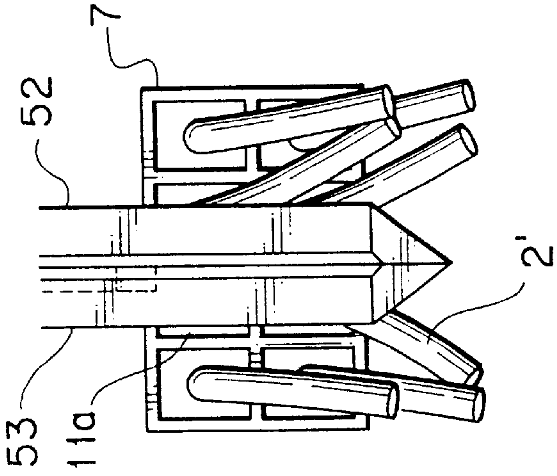
Figure 20A:
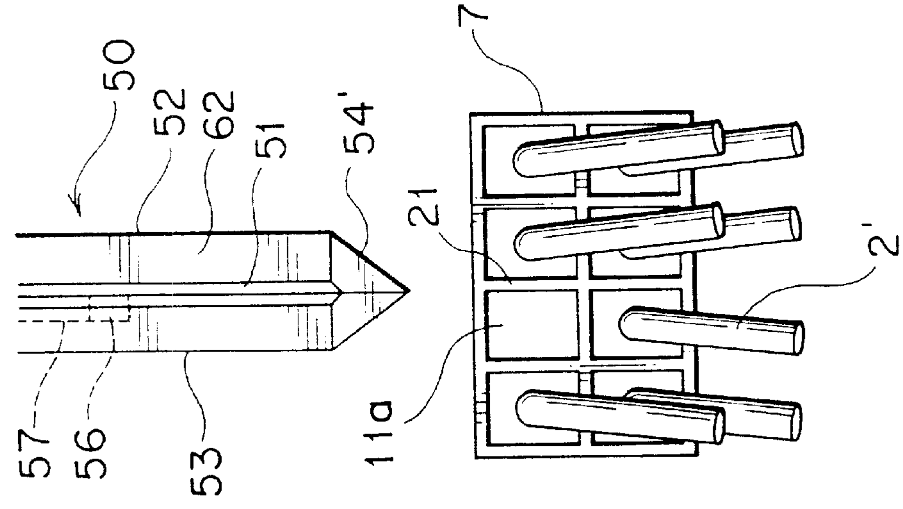

Then, the wire sweeping arm 50 is inserted from the above along a partition wall of the desired opening 11*a* of the terminal accommodating cavities while the both guide arms 52 and 53 are closed as shown in FIGS. 20A and 20B. Then, one of the guide arms 52 and 53 (left guide arm in this embodiment) horizontally moves by about the width of the opening 11*a* of the terminal accommodating cavities to sweep the wires 2'.

The guide wall 57 attached to the right guide arm 52 projects between the guide arms 52 and 53, the inclined guide portion 56 is positioned over the desired opening 11*a* to guide terminal 3 into the opening 11*a* in combination with the rear tapered guide faces 51 of the guide arms 52 and 53.

The wire sweeping arm 50 is detachable in accordance with the shapes of the terminals 3 and the connector housing 7. The open width between the guide arms 52 and 53 is mainly controlled by a serve motor or a ball screw to apply the wire sweeping arm 50 to a variety of terminals 3 and the connector housing 7. Therefore, one kind of the pair of guide arms 52 and 53 are applicable even if the kinds of the terminals 3 and the connector housing 7 are changed.

Figure 21A:
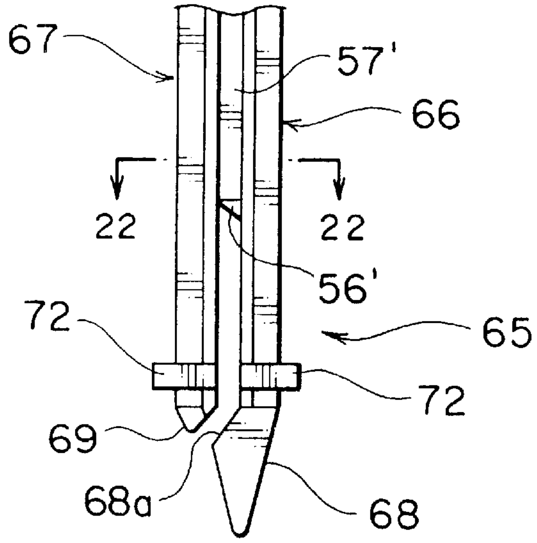
FIGS. 21A and 21B are a rear view of modified wire sweeping arms and an enlarged view of a tip of the modified wire sweeping arms in the closed state.
Figure 21B:
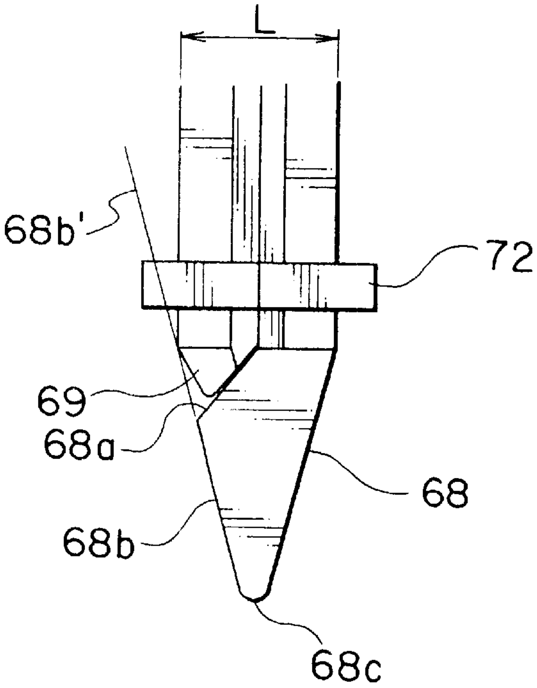
Figure 22:
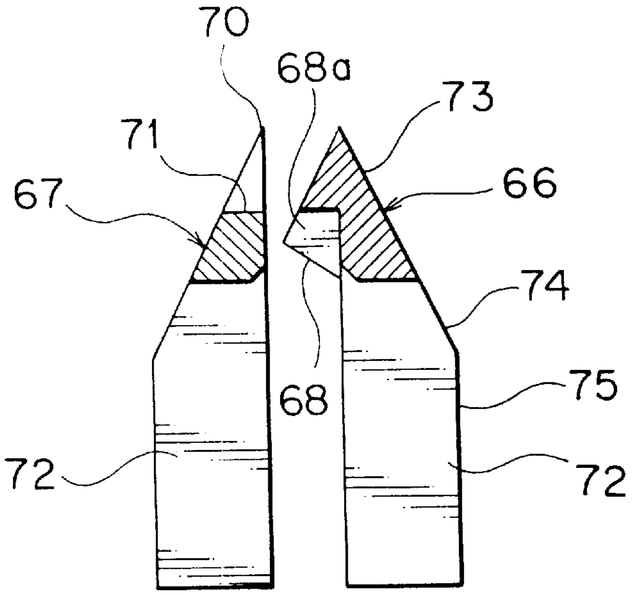
FIG. 22 is a cross-sectional view of the wire sweeping arm taken along the line B—B in FIG. 21A.

FIGS. 21A, B to 24A, B show a wire sweeping arm 65 according to the first embodiment of the present invention, which comprise: a guide arm 66 having an inclined guide portion 56' with a triangular guide face, and an arrow-head portion 68 at a tip thereof; and another guide arm 67 having a tip portion shorter than the arrow head portion 68 of the guide arm 66. The tip portion of the guide arm 67 is formed like a triangular pyramid along a notched face of the arrow head portion 68. The wire sweeping arm 65 according to this embodiment is characterized in that the triangular-pyramid-shaped tip portion 69 is situated inside the notched portion 68*a* when the both guide arms 66 and 67 are closed so that the tip portion 69 does not project beyond an extension line 68*b*' of the slant face of the arrow-head tip portion 68 as illustrated in FIG. 21B.

With the shape of the guide arms 66 and 67, the radius of a round portion 68*c* of the arrow-head tip portion 68 can be designed to be larger, which prevents the wires 2 shown in FIG. 19 from being damaged at the insertion of the guide arms 66 and 67. At the same time, the width L of the wire sweeping arm 65 can be made narrow to facilitate the insertion of the wire sweeping arm 65.

Figure 23:
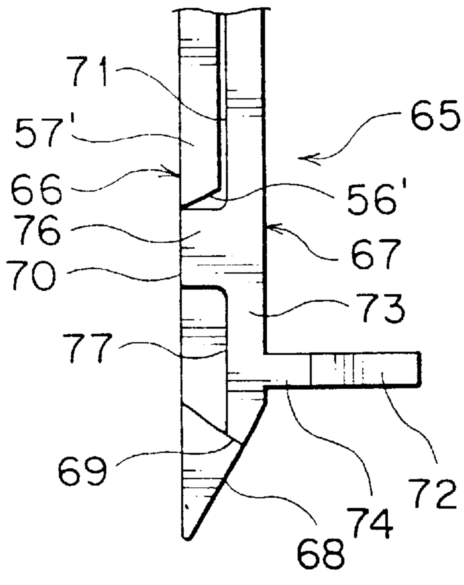
FIG. 23 is a side view of the wire sweeping arms shown in FIG. 21A.

When both guide arms 66 and 67 are closed, a guide wall 57' with a triangular cross-section and an inclined guide portion 56', which is formed on one of the guide arms 66, is engaged with and fully accommodated in a notched portion 71 of the other guide arm 67, which extends from a tip 70 to a middle portion of the arm 67 as shown in FIG. 23 on the side opposing the opening 11, which forms the wire sweeping arm 65 with a wedge-shaped cross section.

Figure 24A:
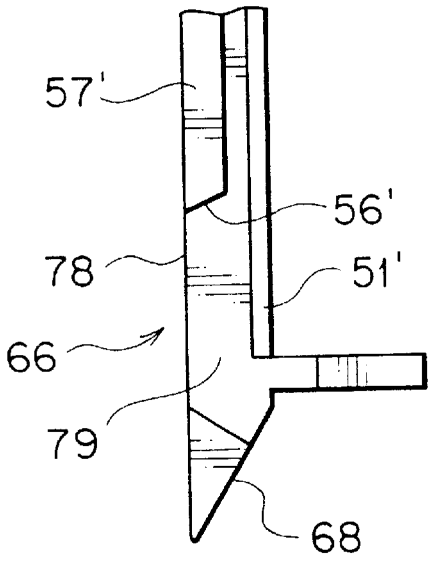
FIGS. 24A and 24B are side views of a pair of guide arms.
Figure 24B:
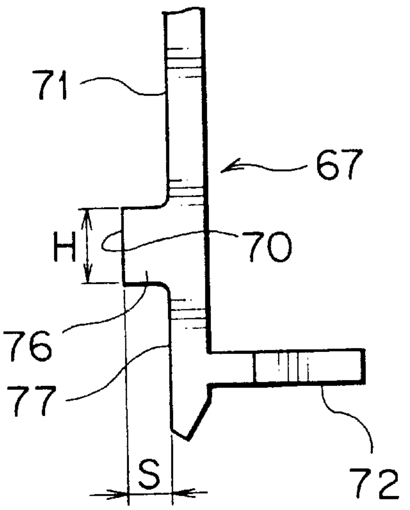

FIGS. 24A and 24B show the shape of the guide arms 66 and 67. The notched portion 71 of the other guide arm 67, which is illustrated in FIG. 24B, extends in a longitudinal direction of the guide arm 67 except for a portion of a guide projection 76 which is formed in the middle of the arm 67. The guide projection 76 opposes the inclined guide portion 56' and is situated at a position lower than the guide portion 56'. An edge 70 of the guide projection 76 coincides with a front edge 78 of the guide arm 66. The guide arm 66 shown in FIG. 24A is provided with a guide wall 57' having the inclined guide portion 56' on a flat engagement face 79 opposing the other guide arm 67. The guide arm further includes a arrow-head tip portion 68 and a rear tapered guide face 51'.

Figure 25:
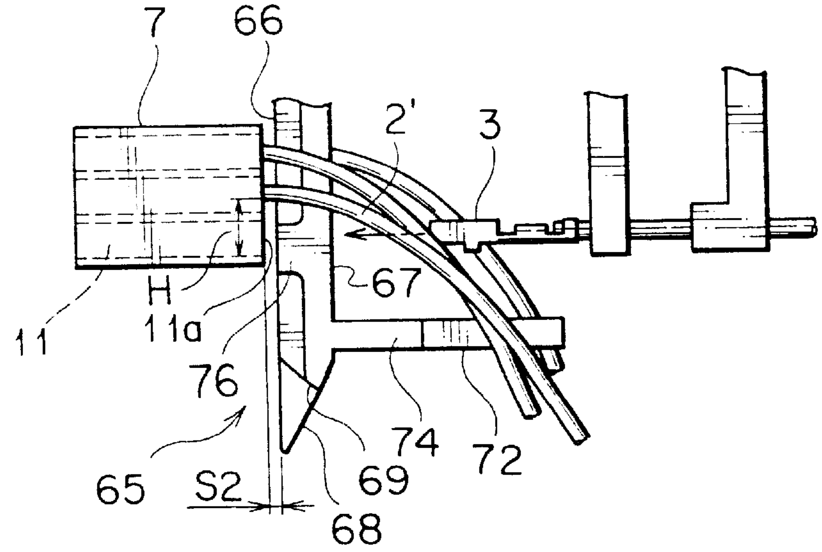
FIG. 25 is a side view showing the position where the wire sweeping arms put the wire aside in the wire sweeping arm according to the first embodiment of the present invention.
Figure 26:
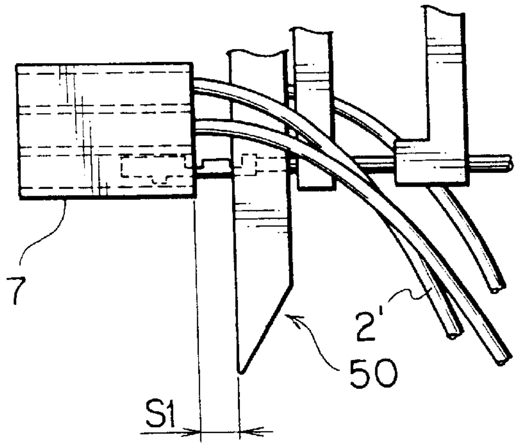
FIG. 26 is a side view of the position where the wire sweeping arms having guide arms but without a notch.

The distance H of the guide projection 76 is slightly larger than the height of the opening of the terminal accommodating cavities 11 as shown in FIG. 25, and the terminal 3 is to be guided along the inner face of the guide projection 76. Further, the width S of the notches 71 and 77 is set to be the difference between the distance S1 which the wire sweeping arm 50 without the notch 71 can sweep the wires 2' as illustrated in FIG. 26, and required minimum distance S2 to prevent the guide arm 67 from contacting the housing 7 when the wire sweeping arm 65 is inserted between the wires 2' as shown in FIG. 25.

When only the other guide arm 67 is moved, as shown in FIG. 20C, the position where the guide arm 67 contacts the wire 2' is rearwardly shifted by the distance S of the notched portion 71, and the position of the wire sweeping arm 65 is set to be nearer the connector housing 7 by the distance S. As a result, the guide projection 76 approaches the opening 11*a* of the terminal accommodating cavities 11, which allows the terminal to be more securely inserted.

As illustrated in FIGS. 21 to 25, a pair of wire intrusion protecting bars 72 horizontally and rearwardly project from portions adjacent to the tip portions 69 of the both guide arms 66 and 61. The wire intrusion protecting bars 72 are provided with tapered portions 74 which are outwardly stretched from the inclined side faces 73, and straight portions 75 next to the tapered portions 74 are wider than the guide arms 66 and 67.

Then, the tip portions 68 and 69 of the guide arms 66 and 67 are inserted between the wires 2', and the wire intrusion protecting bars 72 simultaneously push the wires 2' outward along the tapered portion 74 as shown in FIG. 25. Further, in the process of further inserting the guide arms 66 and 67, the wires 2' slidably contact the tapered portion 74 to the straight portion 75, and the obliquely rearwardly hanging wires 2' are stretched by the straight portion 75 to prevent the wires 2', which are put aside by the guide arms 66 and 67, from intruding inside the guide arms 66 and 67. As a result, the terminal 3 is smoothly inserted into the connector housing 7 from the portion between the guide arms 66 and 67 without interfering with the wires 2'.

Figure 27:
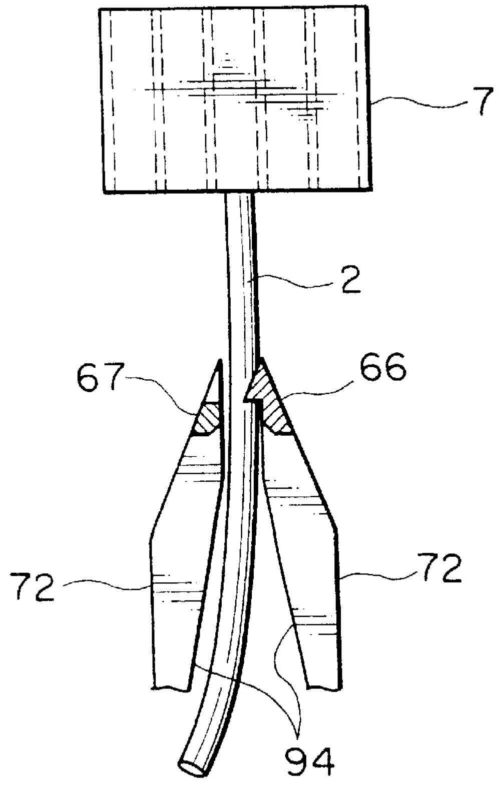
FIG. 27 is a plan view of wire sweeping arms according to another embodiment of the present invention.

As illustrated in FIG. 27, tapered notched portions 94 are formed at tip portions of a pair of wire intrusion protecting bars 72 to protect the wire 2 between the guide arms 66 and 67 from being entrapped while the guide arms 66 and 67 elevate. The elevation of the guide arms 66 and 67 are carried out after the terminal 3 is completely inserted as illustrated in FIG. 25.

Figure 28:
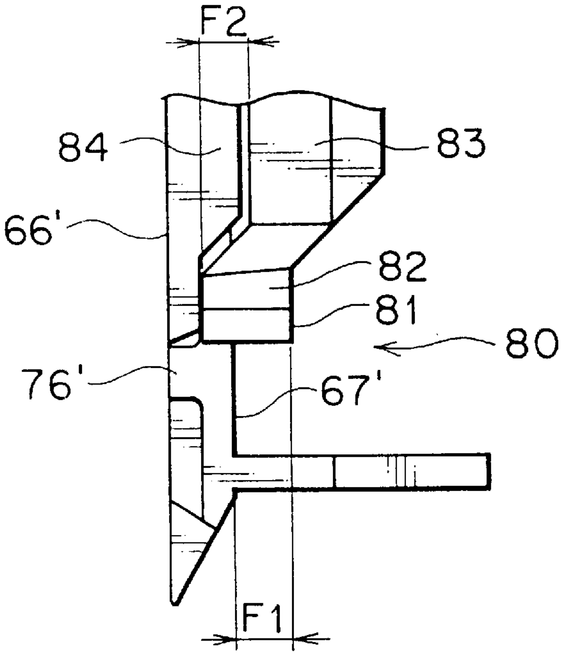
FIG. 28 is a side view of the wire sweeping arms according to the second embodiment of the present invention.
Figure 29:
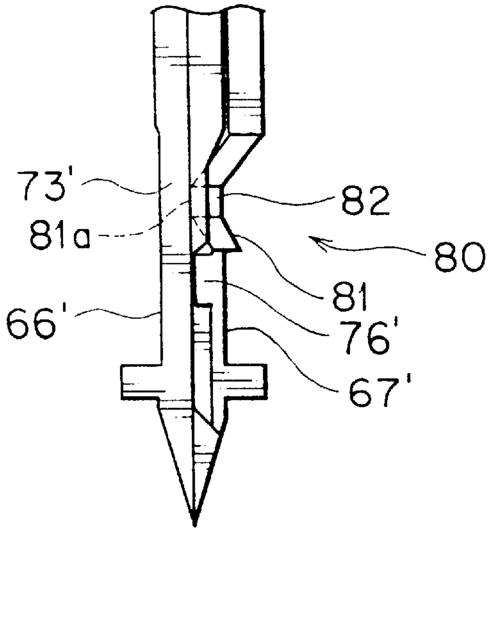
FIG. 29 is a front view of the wire sweeping arm according to the second modification of the present invention.
Figure 30:
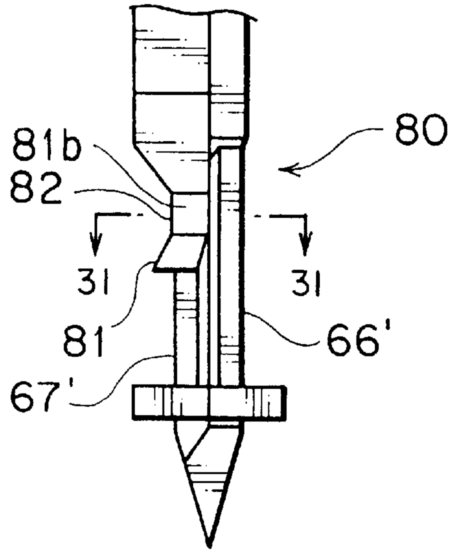
FIG. 30 is a rear view of the wire sweeping arms according to the second modification of the present invention.
Figure 31:
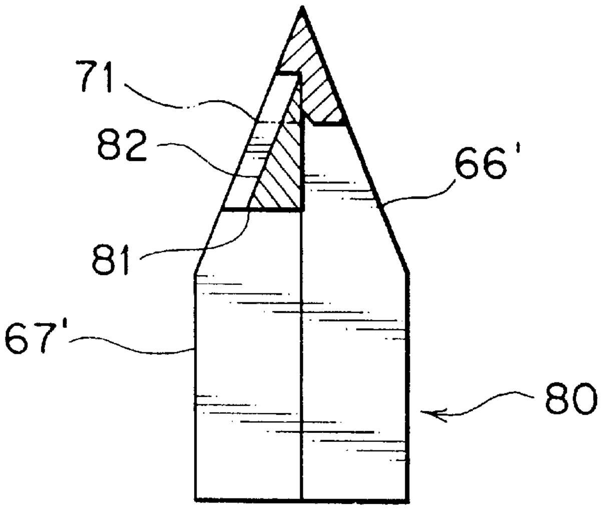
FIG. 31 is a cross-sectional view of the wire sweeping arms taken along the line 31—31 in FIG. 30.

FIGS. 28 to 30 show a wire sweeping arm according to the second modification of the present invention in which the wire sweeping arm 65 illustrated in FIG. 25 is further modified. The wire sweeping arm 80 is characterized in that, as illustrated in FIG. 28, an upper portion of a guide arm 67' from a guide projection 76' projects and extends while rearwardly shifted by the distance F1, and a channel 82 is formed on the offset portion 81 in the direction that the wire is inserted. The portion of the channel 82 is inclined and the thickness thereof gradually increases from a front end 81*a* to a rear end 81*b* of the offset portion 81. When both guide arms 66' and 67' are combined, the channel 82 is positioned nearer the center than inclined side face 73' as illustrated in FIGS. 29 to 31.

Figure 32:
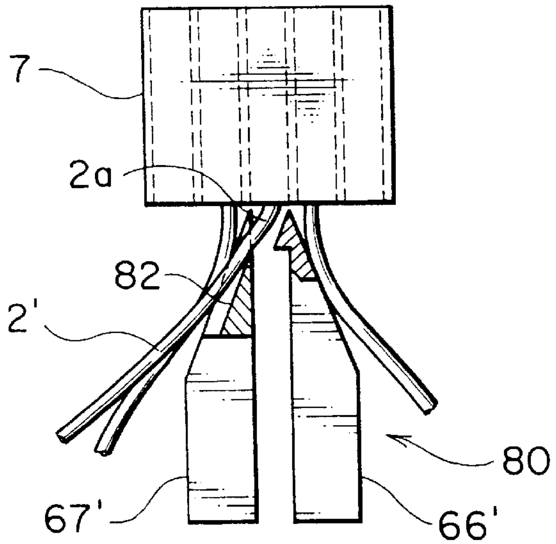
FIG. 32 is a cross-sectional view of the wire sweeping arms putting the wires aside.

A longitudinally extending portion 83 is integrally formed with the channel 82 above the offset portion 81, and is further shifted by the distance F2. The guide arm 66' is also provided with a rearwardly longitudinally projecting portion 84 extending along the longitudinally extendinig portion 83. As shown in FIG. 31, the offset portion 81 in further rearwardly shifted in comparison to the notched portion 71 shown in FIG. 23 according to the previous embodiment. Numeral 71 in FIG. 31 shows the position of the notched portion 71. As illustrated in FIG. 32, the position where the guide arm 67' contacts the wire 2' when the wires 2' are swept by the guide arm 67' is further rearwardly shifted, which not only permits the wire sweeping arm 80 to be positioned in the vicinity of the connector housing 7 but also alleviates the curvature of a portion 2*a* of the wires 2' adjacent to an opening of terminal accommodating cavities, preventing the wire 2' from being damaged or deformed.

Figure 33:
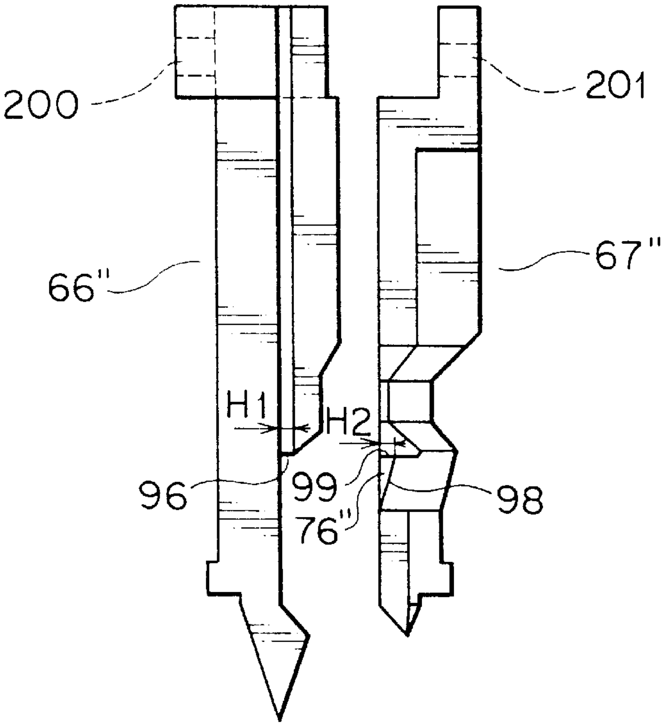
FIG. 33 is a front view of wire sweeping arms according to a third modification of the present invention.
Figure 34:
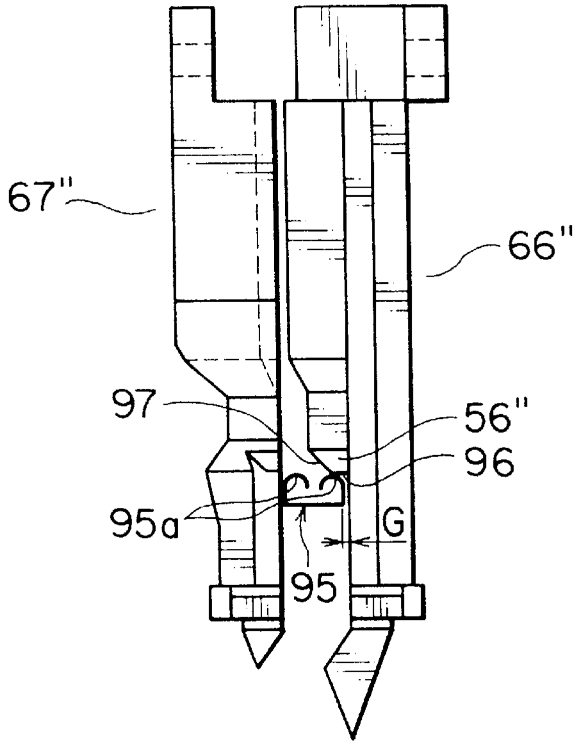
FIG. 34 is a rear view of the wire sweeping arm according to the third modification of the present invention.

FIGS. 33 and 34 show guide arms 66" and 67" for guiding a terminal 95 with a pair of exposed contact curl portions 95*a* at upper portion thereof into the terminal accommodating cavities of the connector housing without vertically shifting. That is, one of the guide arms 66" guiding the terminal 95 is provided with a horizontal contact face 96 at the lowermost portion of an inclined guide portion 56" thereof to guide the curl portion 95*a*, which allows the terminal 95 to horizontally move in the range of the horizontal contact face 96.

The guide face of the inclined guide portion 56" has a shape of substantial triangle without the horizontal contact face 96, and the curl portion 95 elevates along the inclined face 97 on the side of the inclined guide portion in the range of the difference between the width of the terminal and the clearance between the both guide arms 66" and 67". As a result, there is a fear that the terminal 95 is vertically shifted.

In FIG. 33, the guide projection 76" of the guide arm 67" is provided with a downwardly inclined sliding surface 98, and the guide projection 76" is formed to be a wedge of which sharp edge is directed downward. As a result, the inclined sliding surface 98 prevents the guide projection 76" and the wires 2' from being interfered with each other when the arms 66" and 67" are inserted between the wires 2" as shown in FIG. 25, permitting smooth insertion of the arms 66" and 67". The width H2 of the guide projection 76" is slightly wider than the width H1 of the horizontally contacting face 96, and the upper end face 99 is situated below the horizontally contacting face 96 at the engagement of the guide arms. The guide arms 66" and 67" are fixed to driving means not shown through mounting holes 200 and 201.

FIGS. 35A, 35B, 36A, 36B, 36C, 36D and 36E show the construction of the guide arms 66" and 67" or the like in which the terminal 3 can smoothly be inserted even if the terminal 3 with a box-shaped contact portion 3*a* is shifted in the rotating direction. That is, the chamfer dimension of tapered terminal guiding face 51A at the rear portions of the guide arms 66" is larger than that of the other guide arm 67" to correct the position of the terminal 3.

Figure 35A:
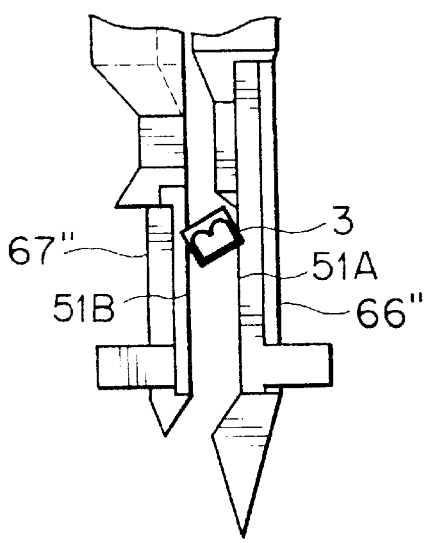
FIGS. 35A and 35B show conditions that a terminal is abnormal position and normal state respectively in wire sweeping arms according to the fourth embodiment of the present invention.
Figure 35B:
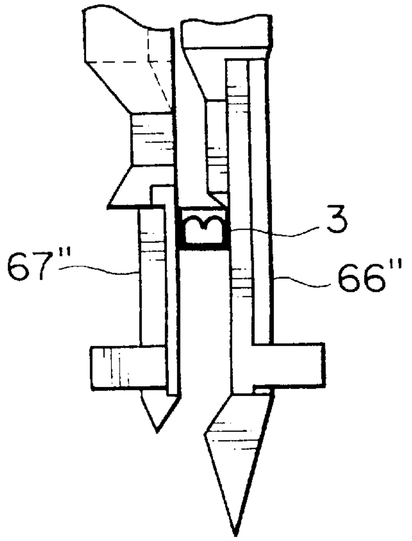
Figures 36A, 36B, 36C, 36D, 36E:
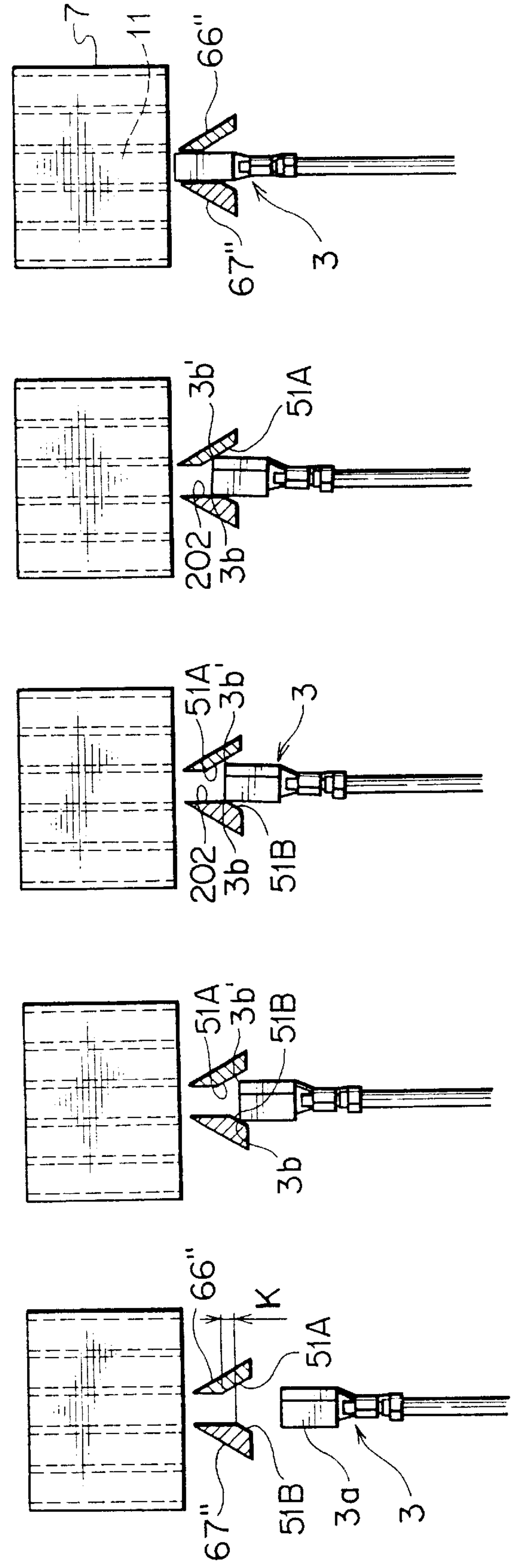
FIGS. 36A to 36E are plan views showing the processes for correcting the position of the terminal by the wire sweeping arm according to the fourth embodiment of the present invention.

As shown in FIG. 36A, the tapered guide faces 51A and 51B of the guide arms 66" and 67" oppose each other with the same inclination. The distance between ends of the guide faces 51A and 51B in the direction that the terminal 3 is inserted is K as indicated in FIG. 36A. The terminal 3 abuts the smaller guide face 51A at an end 3*b* of the box-shaped contact portion 3*a* while shifting in the rotating direction thereof as illustrated in FIG. 35A and 36B. Then, the end 3*b* slides on the guide face 51B and pass therethrough as shown in FIG. 36C. The other end 3*b*'does not contact the larger guide face 51A when the end 3*b* starts to contact an inner side face 202 of the arm. Then, the end 3*b* moves along the inner side face 202 in the arm as shown in FIG. 36D and the other end 3*b*'abuts the larger guide face 51A. As a result, as the other end 3*b*'moves along the larger guide face, the terminal 3 rotates in the direction that the shifting is corrected. Finally, the terminal 3 is introduced into the terminal accommodating cavities 11 of the connector housing under the condition that the terminal 3 is horizontally sustained.

Figure 37C:
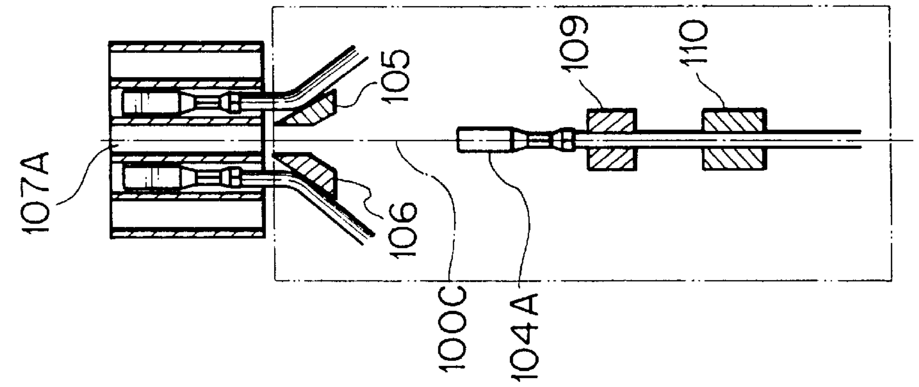
FIGS. 37A to 37C are lateral cross-sectional views for explaining a method of inserting a terminal with wire according to a second embodiment of the present invention.
Figure 37B:
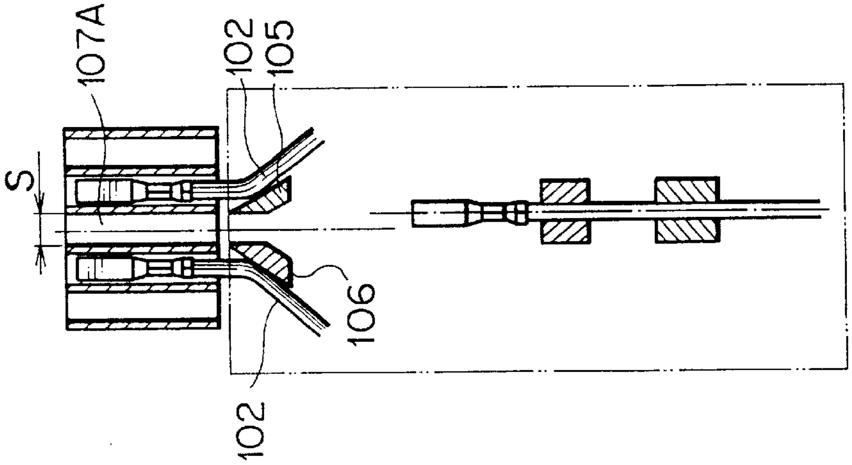
Figure 37A:
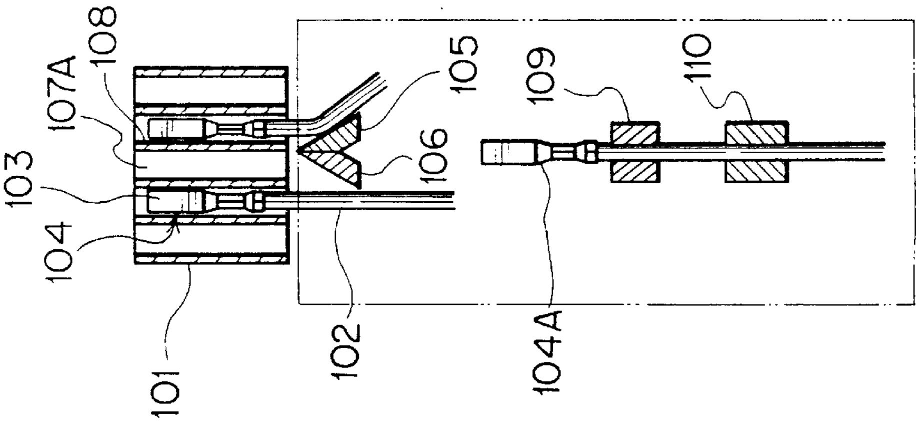
Figure 39D:
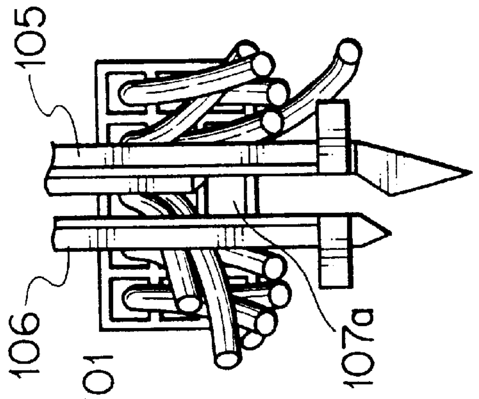
FIGS. 39A to 39D are rear view for explaining the method according to the third embodiment of the present invention.
Figure 39C:
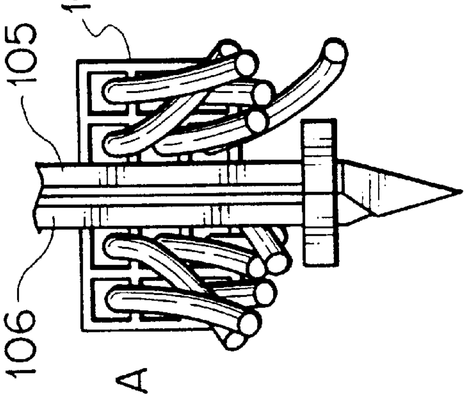

FIGS. 37A to 37C show a method of inserting terminals with wires according to the second embodiment of the present invention. In this method, a pair of guide arms 105 and 106 acting as a wire sweeping arm in a closed state are inserted between wires 102, which are attached to a plurality of terminals already accommodated in a connector housing 101. The guide arms 105 and 106 are inserted from the above in the vicinity of a front end portion of a connector housing into the wires 102 along a partition wall 8 (strictly speaking, an inner wall) of a terminal accommodating cavity 107A to which the terminal with wire 103 is being inserted. The reason why the guide arms 105 and 106 are inserted along the partition wall 108 of the terminal accommodating cavities 107A is to prevent the terminal with wire 103 from interfering with wires 102A which are already inserted into upper accommodating cavities as illustrated in FIG. 39A. A terminal with wire 104A is situated behind the guide arms 105 and 106 with being supported by the wire supporting hands 109 and 110. The wire supporting hands and the guide arms 105 and 106 are independently laterally moved by driving devices (not shown).

Then, the guide arm 106 opens by the width S of the terminal accommodating cavity 107A to put the neighboring wire 102 aside as illustrated in FIG. 37B. In this case, the terminal with wire 104A does yet not move and is situated at the same position as FIG. 37A. Then, the terminal with wire 104A is laterally moved together with the wire supporting hands 109 and 110 as shown in FIG. 37C. The sweeping of the wires 102 and the movement of the terminal with wire 104A may be carried out at the same time. The terminal with wire 104A is transported by the wire supporting hands 109 and 110 between the guide arms 105 and 106 and inserted into the terminal accommodating cavity 107A.

Figure 38C:
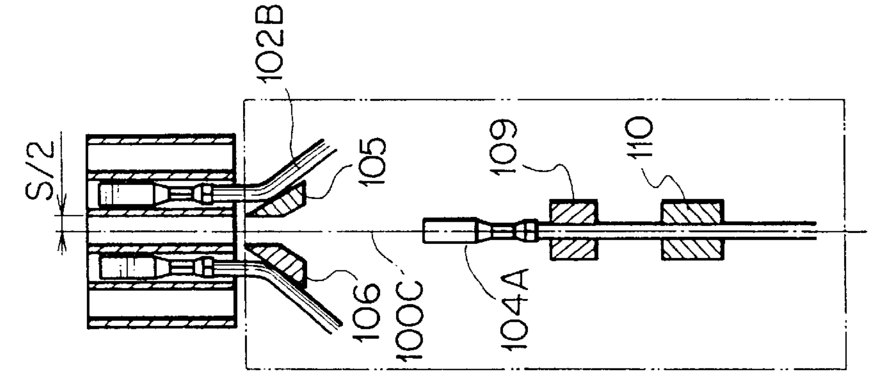
FIGS. 38A to 38C are laterally cross-sectional views for explaining a method of inserting a terminal with wire according to a third embodiment of the present invention.
Figure 38B:
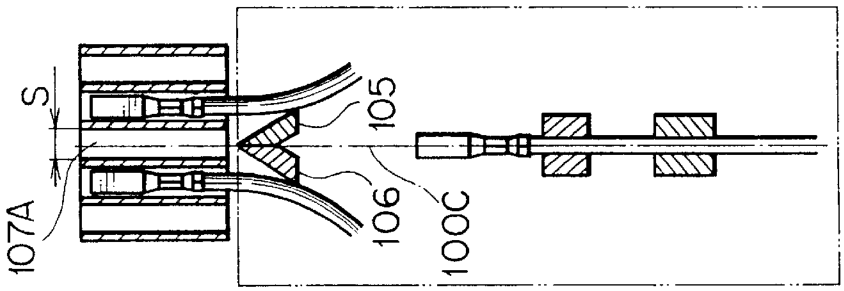
Figure 38A:
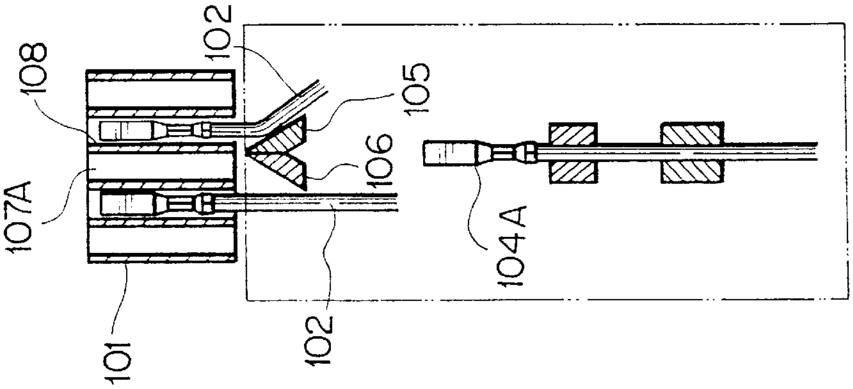

FIGS. 38A to 38C show a method of inserting terminals with wires according to the third embodiment of the present invention. In this method, as illustrated in FIG. 38A, the pair of guide arms 100 and 106 are inserted between the wires 102 along the partition wall 108 of the terminal accommodating cavities 107A of the housing 101 like the previous method shown in FIG. 37A. Then, the guide arms 105 and 106 are laterally transported with the guide arms being closed toward the desired terminal accommodating cavity 107A as shown in FIG. 38B, and both guide arms 105 and 106 are simultaneously opened right and left respectively by the half of the width S of the terminal accommodating cavity 107A as shown in FIG. 38C to align the axis of the terminal accommodating cavity 107 and the center of the both guide arms 105 and 106.

As illustrated in FIGS. 38B and 38C, the terminal with wire 104A moves together with the guide arms 105 and 106 by a driving apparatus described below, and the center between the guide arms 105 and 106 and the axis of the wire supporting hands 109 and 110, in other words, the axis of the terminal with wire 104A are on the same line. The operations shown in FIGS. 38B and 38C are performed at the same time. However, the operation in FIG. 38B may be carried out slightly earlier, which prevents a wire 102B from being swept excessively by the guide arm 105.

Figure 39B:
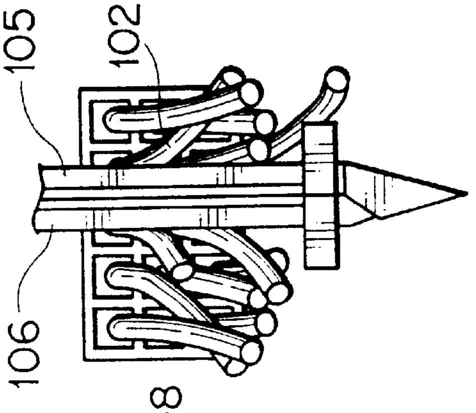
Figure 39A:
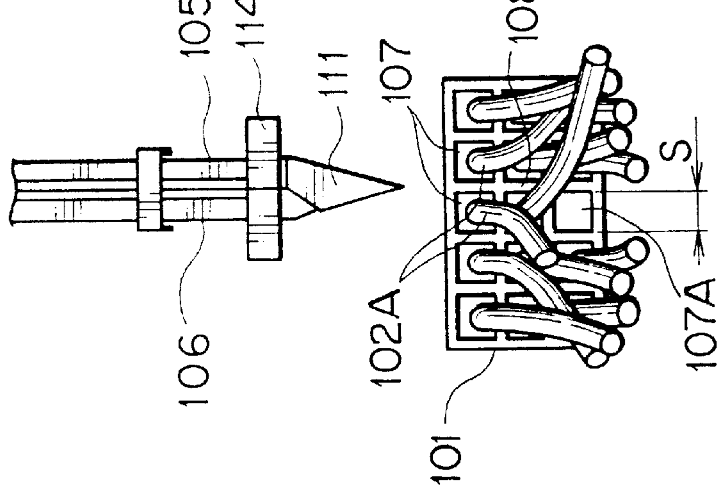
Figure 40A:
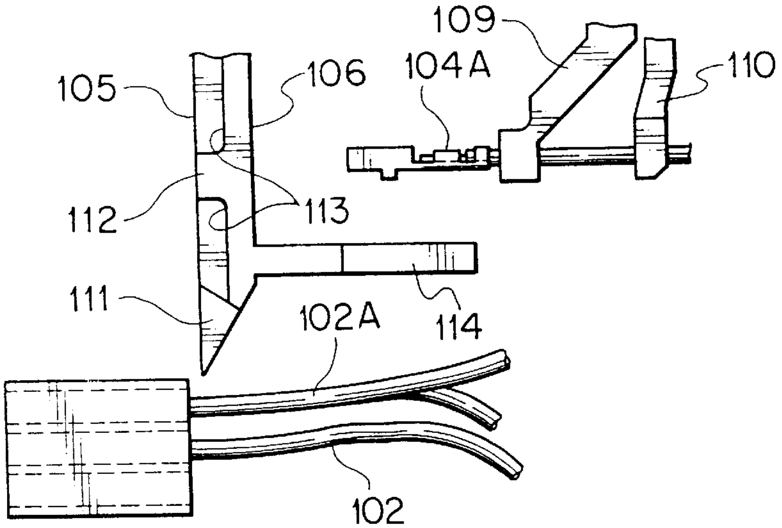
FIGS. 40A to 40C are side views for explaining the method according to the third embodiment of the present invention.

FIGS. 39A and 40A show the condition in which the pair of guide arms 105 and 106 in the closed state are situated above and adjacent to the connector housing 101. The terminal with wire 104A is supported by the wire supporting hands 109 and 110, and is situated behind the guide arms 105 and 106. The guide arms 105 and 106 form a substantial triangular cross-section when combined. One of the guide arms 105 is provided with a triangular pyramid tip portion 112 and the other guide arm 106 includes a guide projection 112 for sweeping the wires and guiding the terminal in position, and a notched portion 113 for the relief of upper and lower wires 102. Further, each of the guide arms 105 and 106 is provided with a wire intrusion protection bar 114 for preventing the wires 102 from intruding inwardly.

Figure 40B:
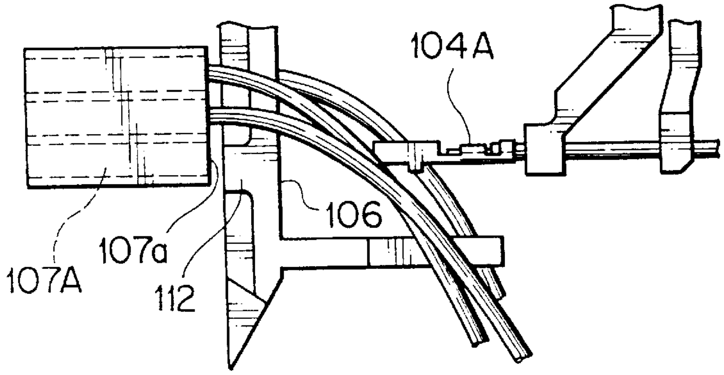

The guide arms 105 and 106 in closed state are inserted from the above between the wires 102A alone the partition wall 108 of the desired terminal accommodating cavities 107A as illustrated in FIG. 39B to prevent interference between the upper wires 102A and the guide arms 105 and 106. Then, the guide projection 102 of the guide arm 106 opposes an opening 101*a* of the desired terminal accommodating cavity 107A as shown in FIG. 40B. the terminal with wire 104A is situated behind the guide projection 112.

Figure 40C:
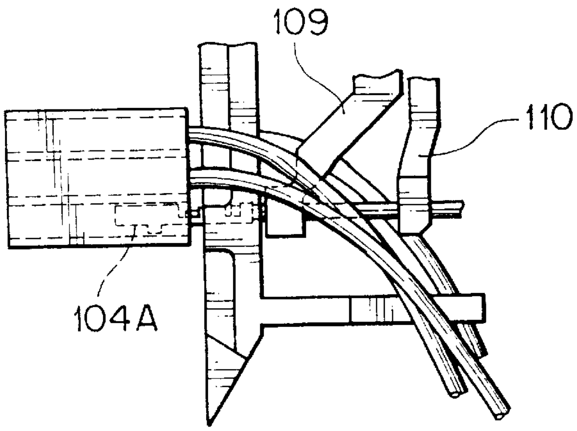

Then, the pair of guide arms 105 and 106 transversely transported toward the center of the desired terminal accommodating cavity 107A with the guide arms 105 and 106 closed as illustrated in FIG. 39*c*, and the guide arms 105 and 106 open right and left as shown in FIG. 39D to sweep the wires, and the opening 107*a* of the terminal accommodating dating cavity 107A is provided between the opened guide arms 105 and 106. In FIG. 39C, instead of transversely moving the guide arms 105 and 106, the connector housing 101 may be transversely moved in the reverse direction to the movement of the guide arms 105 and 106 by the half of the width S of the terminal accommodating cavity 107A. Then, the terminal with wire 104A is inserted into the terminal accommodating cavity 107A by the wire supporting hands 109 and 110 as shown in FIG. 40A–C.

Figure 41:
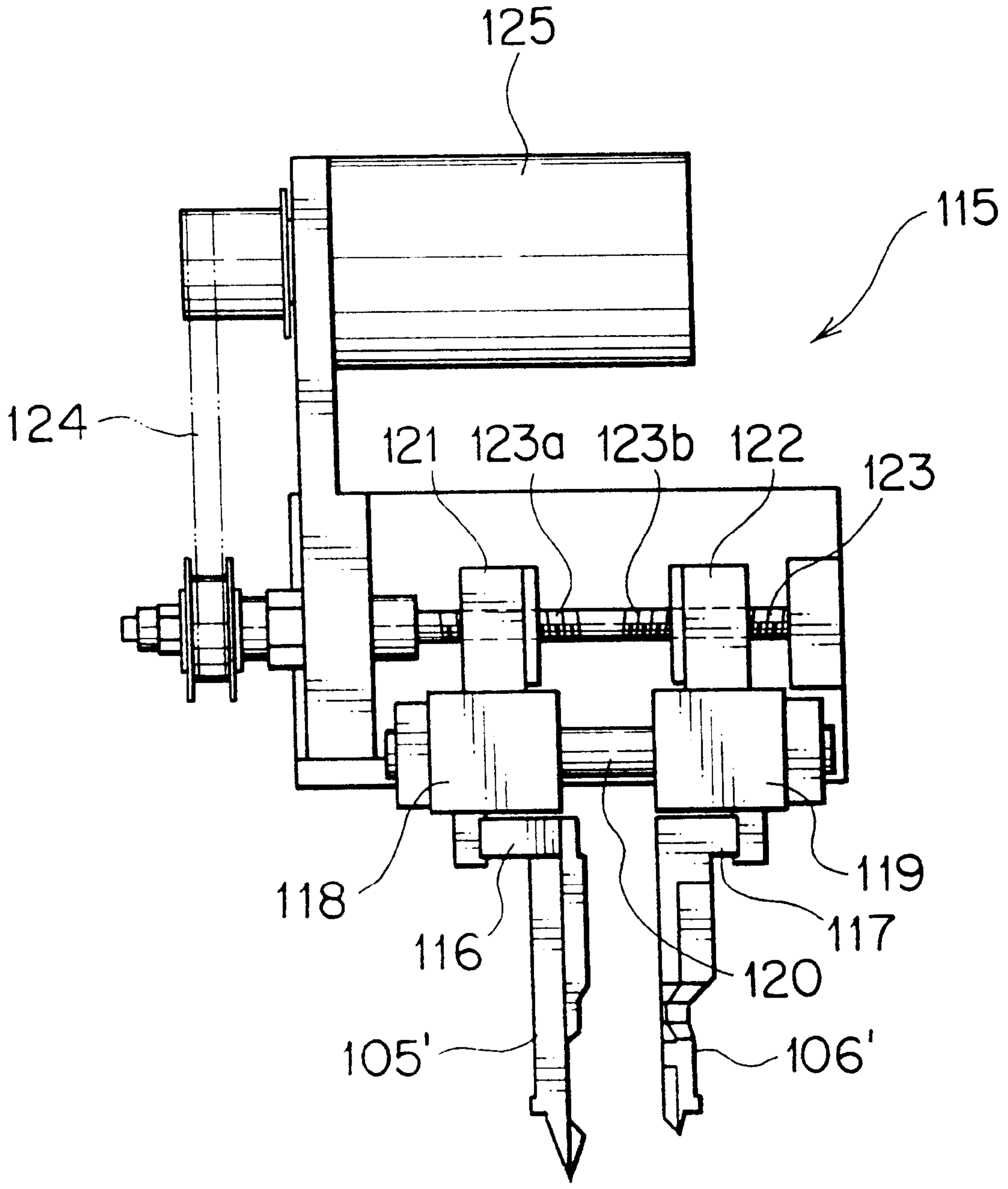
FIG. 41 is a front view of a driving device for wire sweeping arms according to a first embodiment of the present invention.

FIG. 41 shows a driving apparatus for the wire sweeping arms which is applied to the method of inserting terminals with wires according to the second embodiment of the present invention. The driving apparatus 115 comprises: direct-drive sliders 118 and 119 for fixing base portions 116 and 117 of a pair of guide arms 105' and 106'; a horizontal guide shaft 120 capable of transversely moving the sliders 118 and 119; nuts 121 and 122 fixed to the sliders 118 and 119, a ball screw 123 with right and left-handed screw portions 123*a* and 123*b* to which the nuts 121 and 122 are attached; and a servo motor 125 for rotating the screw shaft 123 through a timing belt 124.

With the driving apparatus described above, the guide arms 105' and 106' can accurately be opened by the same distance, and the distance between the guide arms 105' and 106' is freely set by using the serve motor 125. It takes approximately 0.25 seconds to fully open the guide arms 105' and 106'.

Figure 42:
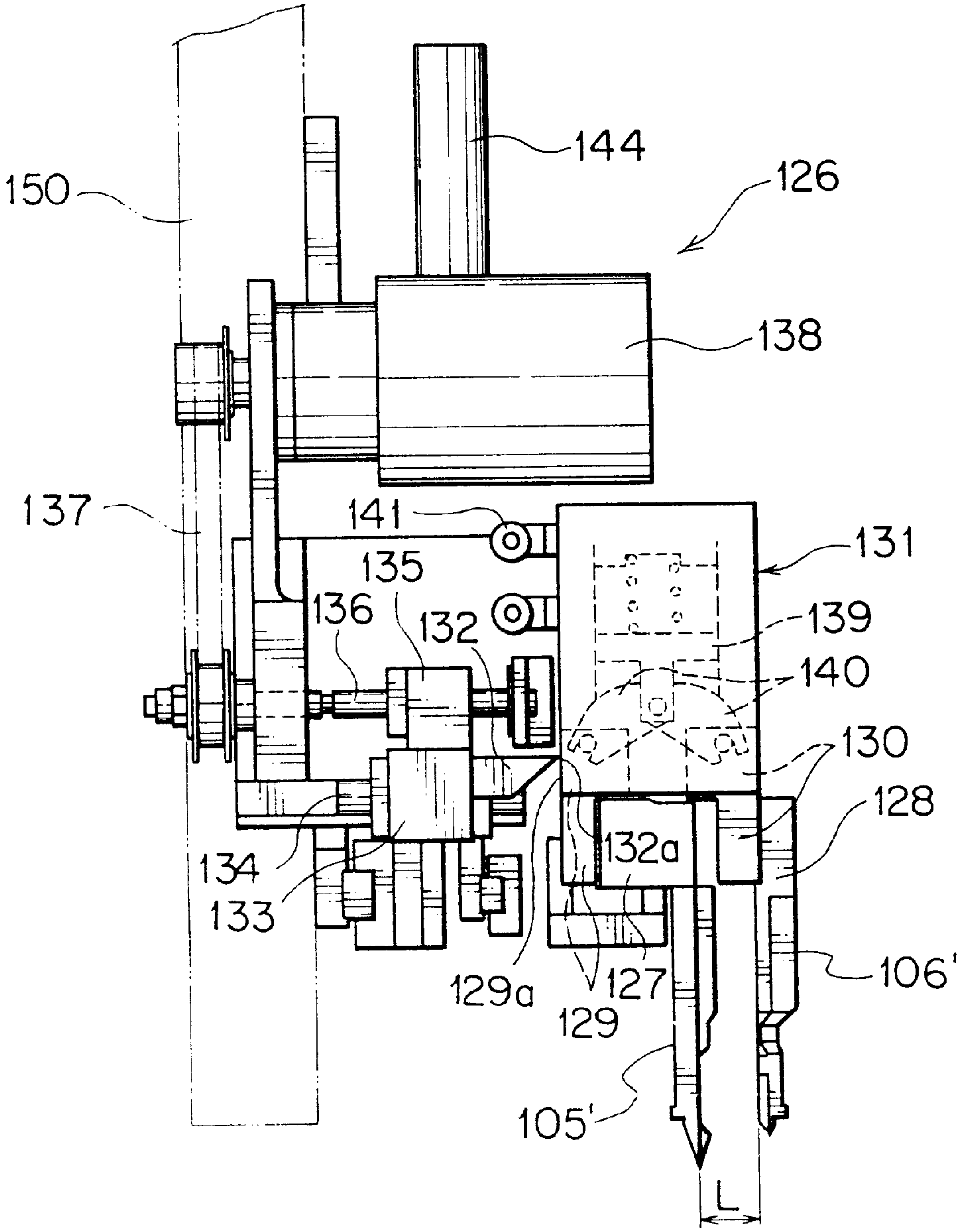
FIG. 42 is a front view of a driving device for wire sweeping arms according to a second embodiment of the present invention.
Figure 43:
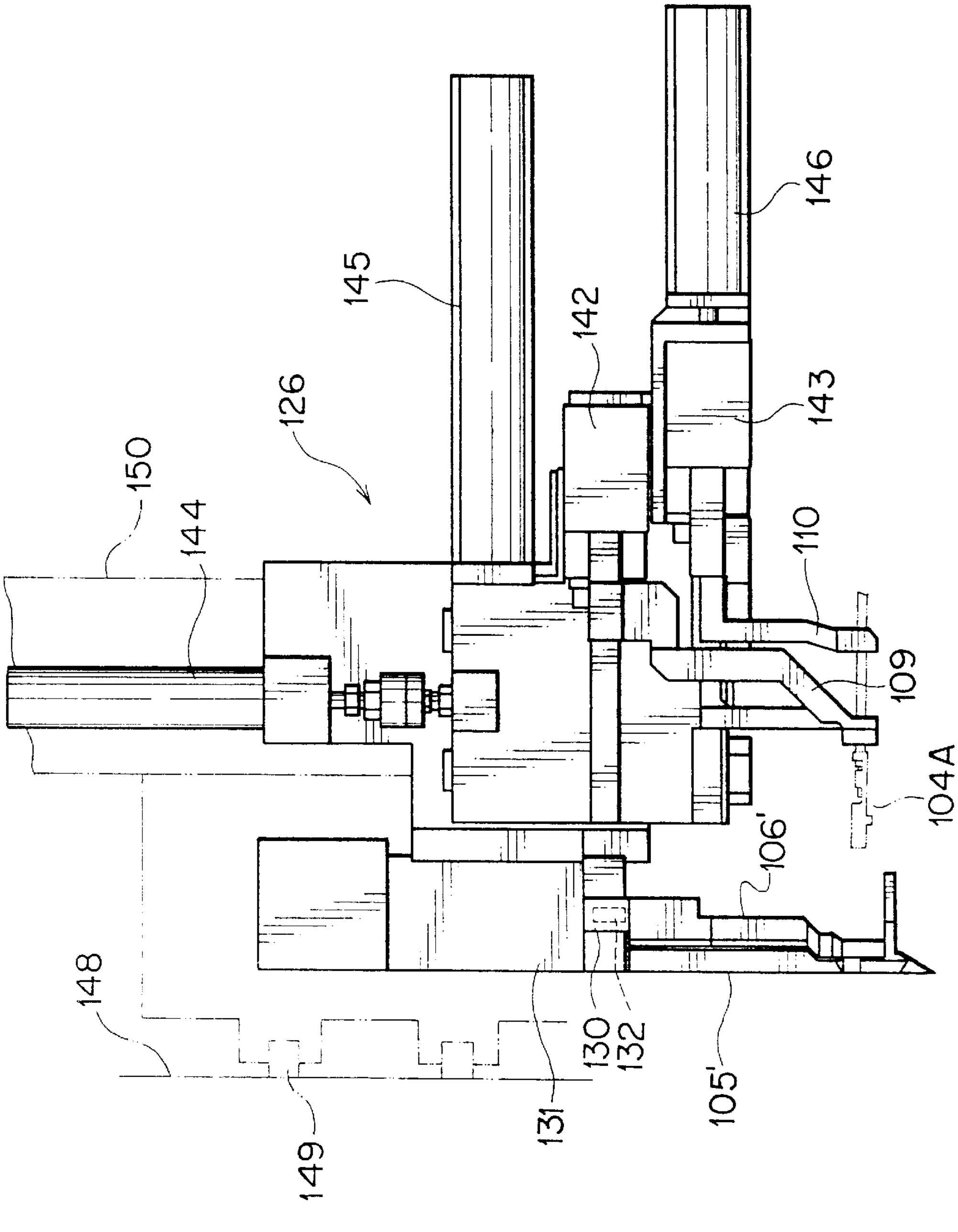
FIG. 43 is a side view of the wire sweeping arms according to the second embodiment of the present invention.
Figure 44:
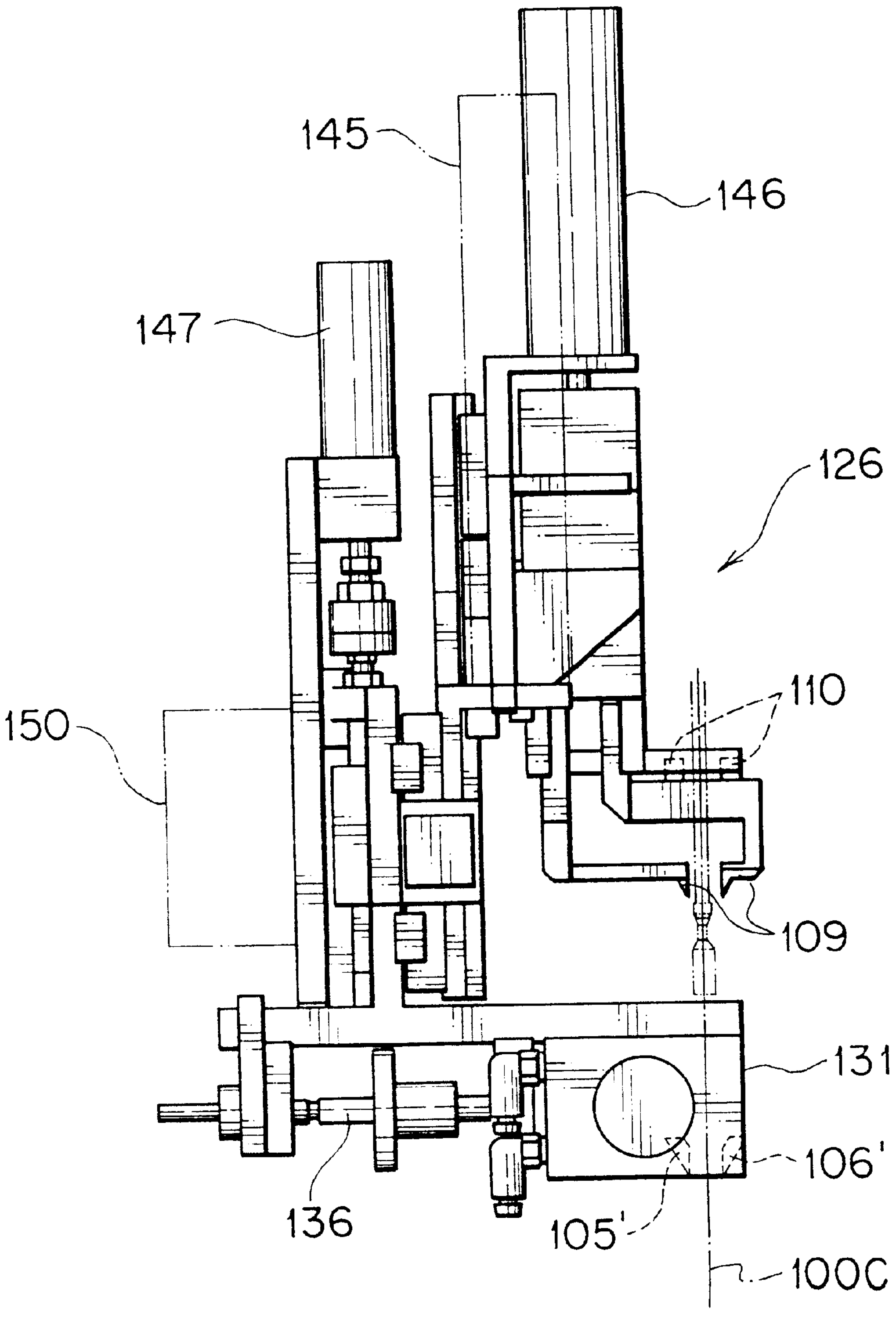
FIG. 44 is a plan view of the wire sweeping arms according to the second embodiment of the present invention.
Figure 45:
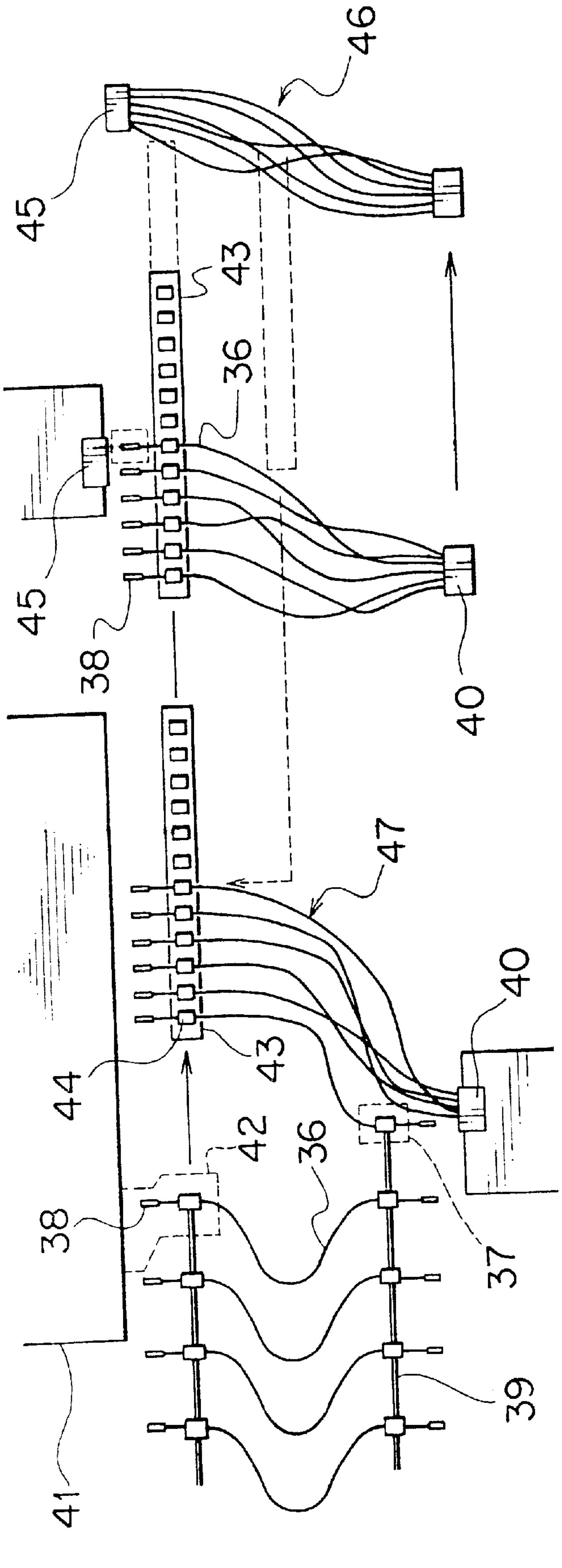
FIG. 45 PRIOR ART
FIG. 45 is a schematic view for explaining a conventional method of inserting terminals with wire in terminal accommodating cavities.

FIGS. 42 to 44 show a driving apparatus for the wire sweeping arms according to the second embodiment of the present invention. The driving apparatus 128 comprises: an air cylinder 131 with a pair of legs 129 and 130 for fixing the base portions 127 and 128 of the guide arms 105' and 106'; a stopper 132 abutting an outer face 129*a* of one of the legs 129; a holder 133 for fixing the stopper 132; a guide rail 134 for transversely moving the holder 133; a nut 135 fixed to the holder 133; a screw portion 136 engaged with the nut 135; and a small servo motor 138 for rotating the screw shaft 136 through a timing belt 137, as illustrated in FIG. 42.

The air cylinder 131 includes a vertically slidable piston 139, a pair of driving links 140 rotatably supported at a tip of the piston 139, and the legs 129 and 130 moved by the links 140, and is driven through air pressure from an air duct 141. The legs 129 and 130 are stopped by a tip 132*a* of the stopper 132, and the stopper 132 is movable right and left on the horizontal guide rail 134 by the servo motor 138, which determines the distance L between the guide arms when fully opened. The servo motor 138 is used for driving the stopper 132 with small force. Therefore, the output of the motor 138 can be decreased in comparison to that according to the first embodiment, resulting in reduced weight of moving elements of the apparatus and quick action.

Wire supporting hands 109 and 110 are integrally formed with the driving apparatus 126 for a terminal with wire 104A as shown in FIGS. 43 and 44. The wire supporting hands 109 and 110 are opened and closed by the air cylinders 149 and 143. The front wire supporting hand 109 grasping the terminal or a portion adjacent to the terminal is vertically movable through a vertical cylinder 144. The both wire supporting hands 109 and 110 are forwardly movably by a first horizontal cylinder 145, and the rear wire supporting hand 110 further proceed by a second horizontal cylinder 146. In other words, the wire supporting hands 109 and 110 proceed toward the guide arms 105' and 106' by the first horizontal cylinder 145 while the wire supporting hands 109 and 110 grasp the terminal with wire 104A, and the vertical cylinder 144 causes the front wire supporting hand 109 to elevate, and then, the second horizontal cylinder 146 causes the rear wire supporting hand 110 to insert to terminal with wire 14A into the connector housing. Reference numeral 147 shows a drawer cylinder for checking the insertion of the terminal.

As illustrated in FIG. 44, the centers of the guide arms 105' and 106', and the wire supporting hands 109 and 110 are on the same line 100C, and the apparatus 126 is totally vertically movable through a screw shaft not shown attached to the frame 150 as shown in FIG. 42. Further, the apparatus 126 is horizontally movable along a horizontal guide 149 on an outer frame 148 as illustrated in FIG. 43. As a result, the guide arms 105' and 106' and the wire supporting hands 109 and 110 are integrally movable to obtain the operation indicated in FIGS. 38A to 39C.

Moreover, it takes less than 0.1 second to fully open the guide arms 105' and 106', which is almost the same as the time for the action of the cylinder, and is shorter in comparison to the first embodiment of the present invention described above. Then, since the air cylinder 131 is adopted in this embodiment, there is no fear that the wire 102 is forced to be pushed by the guide arms 105' and 106', which prevents the wire 2 from being damaged even if the wire 2 is caught between the guide arms 105' and 106'. It is sufficient to adjust the distance L between the guide arms 105' and 106' by the stopper 132 while the guide arms 105 and 106 descend about the connector housing 101 as illustrated in FIGS. 39A and 39B or while the guide arms 105 and 106 are moved toward another terminal accommodating cavity 107*a* as shown in FIG. 39D, which shortens the cycle time of the operation.

In the above method according to the present invention, wire sweeping arms or terminal supporting hands put neighboring terminals with wires aside to insert a terminal with wire into a desired opening of the terminal accommodating cavities, which prevents the terminal with wire from interfering the neighboring terminals, resulting in smooth insertion of the terminal. Therefore, it is unnecessary to insert the terminals from an end of the connector housing as carried out in conventional method, in other words, the terminals can be inserted into the terminal accommodating cavities at random. As a result, in the present method, the work for rearrange the terminals in the order accommodated in the terminal accommodating cavities to reduce manhour for the work and the space for the manufacturing line of the wire harness. Further, a wire harness for multiple circuits can be manufactured since the number of terminals to be accommodated is not restricted in the present method because no is necessary in order to perform work on rearrangement the terminals.

What is claimed is:

1. An apparatus for driving a wire sweeping arm which is used for sweeping wires already inserted into neighboring terminal accommodating cavities when a terminal with wire is inserted into one of the terminal accommodating cavities in a connector housing comprising:

an air cylinder with a pair of legs for fixing a pair of guide arms, said guide arms used for sweeping the already accommodated wires and inserting the terminal with wire into the terminal accommodating cavities;

a stopper abutting an outer face of one of the legs;

a holder for fixing the stopper;

a guide rail on which said holder travels in the direction perpendicular to the direction that the terminal with wire is inserted;

a screw shaft rotatably inserted into the holder; and a servo motor for rotating said screw shaft.

2. An apparatus for inserting a terminal with wire into a terminal accommodating cavity surrounded by a plurality of adjacent terminal accommodating cavities in a connector housing, the apparatus comprising:

an inserting device for supporting and inserting the terminal with wire into the terminal accommodating cavity in a connector housing;

an elongated sweeping device having a pair of guide arms with triangular cross-sections, said guide arms each having a triangular tip portion to form a wedge shaped tip when said guide arms are joined after said guide arms are opened to spread apart other nearby wires;

an inclined guide portion projecting from an engagement face of a first guide arm of said pair of guide arms; and a notch attached to an engagement face of a second guide arm of said pair of guide arms for accommodating said inclined guide portion.

3. The apparatus according to claim 2, wherein a triangular guide face is formed on said inclined guide portion, and a horizontal contact face is formed on the inclined guide portion to horizontally move curl portions of the terminal with wire along said horizontal contact face.

4. The apparatus according to claim 2, wherein tapered terminal quide faces for guiding the terminal with wire are formed on inner rear ends of the pair of guide arms differently from each other in chamfered dimensions in order to guide the terminal with wire slidably by the tapered guide faces one after another for correcting the shifting of position of the terminal with wire in a rotary direction while inserting the terminal with wire into the terminal accommodating cavity.

5. An apparatus for inserting a terminal with wire into a terminal accommodating cavity surrounded by a plurality of adjacent terminal accommodating cavities in a connector housing, the apparatus comprising:

an inserting device for supporting and inserting the terminal with wire into the terminal accommodating cavity in a connector housing;

an elongated sweeping device having a pair of guide arms with triangular cross-sections, said guide arms each having a triangular tip portion to form a wedge shaped tip when said guide arms are joined;

an inclined guide portion projecting from an engagement face of a first guide arm of said pair of guide arms: and a notch attached to an engagement face of a second guide arm of said pair of guide arms for accommodating said inclined guide portion.

wherein said notch is formed from a front end portion to a middle portion of the second guide arm and longitudinally extends except for a guide projection situated in the middle of the second guide arm, and said guide projection opposing the inclined guide portion of the first guide arm and guiding the insert device with an inner face thereof.

6. The apparatus according to claim 5, wherein an inclined slide face is formed on an outer face of the guide projection, and tip of said guide projection is formed into a wedge shape.

7. The apparatus according to claim 5, wherein an offset portion projects from a portion adjacent to the guide projection of the second guide arm in a direction that the terminal with wire is extracted.

8. An apparatus for inserting a terminal with wire into a terminal accommodating cavity surrounded by a plurality of adjacent terminal accommodating cavities in a connector housing, the apparatus comprising:

an inserting device for supporting and inserting the terminal with wire into the terminal accommodating cavity in a connector housing;

an elongated sweeping device having a pair of guide arms with triangular cross-sections, said guide arms each having a triangular tip portion to form a wedge shaped tip when said guide arms are joined;

an inclined guide portion projecting from an engagement face of a first guide arm of said pair of guide arms; and a notch attached to an engagement face of a second guide arm of said pair of guide arms for accommodating said inclined guide portion, wherein an arrow-head portion is formed at the tip of the first guide arm, and the tip of the second guide arm is made shorter than that of the first guide arm for being accommodated in a notch of said arrow-head tip of said first guide arm.

9. An apparatus for inserting a terminal with wire into a terminal accommodating cavity surrounded by a plurality of adjacent terminal accommodating cavities in a connector housing, the apparatus comprising:

an inserting device for supporting and inserting the terminal with wire into the terminal accommodating cavity in a connector housing;

an elongated sweeping device having a pair of guide arms with triangular cross-sections, said guide arms each having a triangular tip portion to form a wedge shaped tip when said guide arms are joined;

an inclined guide portion projecting from an engagement face of a first guide arm of said pair of guide arms, and a notch attached to an engagement face of a second guide arm of said pair of guide anus for accommodating said inclined guide portion.

wherein wire intrusion protecting bars are formed respectively on the pair of guide arms, said bars are tapered at the side of the pair of guide arms for sweeping aside the wires of terminals being already accommodated in terminal accommodating cavities neighboring the entrance of the terminal accommodating cavity to expose.

10. The apparatus according to claim 9, wherein tapered notches are formed on said wire intrusion protecting bars from their tips to inner portions thereof to prevent wires from being entrapped between the guide arms.

11. An apparatus for inserting a terminal with wire into a terminal accommodating cavity surrounded by a plurality of adjacent terminal accommodating cavities in a connector housing, the apparatus comprising:

an inserting device for supporting and inserting the terminal with wire into the terminal accommodating cavity in a connector housing;

an elongated sweeping device having a pair of guide arms with triangular cross-sections, said guide arms each having a triangular tip portion to form a wedge shaped tip when said guide arms are joined;

an inclined guide portion protecting from an engagement face of a first guide arm of said pair of guide arms, and a notch attached to an engagement face of a second guide arm of said pair of guide arms for accommodating said inclined guide portion, further comprising a driving device for driving an elongated sweeping device, said driving device is comprised of:

an air cylinder with a pair of legs for fixing a pair of guide arms for sweeping the wires being already accommodated in the terminal accommodating cavities;

a stopper abutting an outer face of one of the legs;

a holder for fixing the stopper;

a guide rail on which said holder travels in the direction perpendicular to the direction that the terminal with wire is inserted;

a screw shaft rotatably inserted into the holder; and a servo motor for rotating said screw shaft.

* * * * *